United States Patent
Liu

(10) Patent No.: US 12,356,188 B2
(45) Date of Patent: Jul. 8, 2025

(54) METHOD AND APPARATUS FOR HANDLING AUTHENTICATION FAILURE DURING SECURITY ASSOCIATION ESTABLISHMENT

(71) Applicant: Nokia Solutions And Networks Oy, Espoo (FI)

(72) Inventor: Jennifer Liu, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 652 days.

(21) Appl. No.: 17/257,106

(22) PCT Filed: Jun. 28, 2019

(86) PCT No.: PCT/US2019/039992
§ 371 (c)(1),
(2) Date: Dec. 30, 2020

(87) PCT Pub. No.: WO2020/006515
PCT Pub. Date: Jan. 2, 2020

(65) Prior Publication Data
US 2021/0136582 A1    May 6, 2021

Related U.S. Application Data

(60) Provisional application No. 62/692,722, filed on Jun. 30, 2018.

(51) Int. Cl.
*H04W 12/08* (2021.01)
*H04W 8/08* (2009.01)
(Continued)

(52) U.S. Cl.
CPC ............. *H04W 12/08* (2013.01); *H04W 8/08* (2013.01); *H04W 12/0471* (2021.01);
(Continued)

(58) Field of Classification Search
CPC . H04W 12/08; H04W 12/06; H04W 12/0471; H04W 8/08; H04W 48/16; H04W 60/00
See application file for complete search history.

(56) References Cited

U.S. PATENT DOCUMENTS 9,877,198 B1    1/2018   Liu
2011/0093919 A1   4/2011   Naslund et al.
(Continued)

FOREIGN PATENT DOCUMENTS

CL    2020002557 A1    1/2021
CL    2020002558 A1    1/2021
(Continued)

OTHER PUBLICATIONS

Office Action and Search Report for Russian Application No. 2020143958/07 dated Jul. 19, 2021, 15 pages.
(Continued)

*Primary Examiner* — Noura Zoubair
(74) *Attorney, Agent, or Firm* — ALSTON & BIRD LLP

(57) ABSTRACT

An interworking function in a core network system, such as a 5G core network, attempts to establish a secure association with user equipment (UE) in an untrusted access network. When the secure association is not accepted by the 5G core network, the UE receives from the core network a response including a message type indicating that Non-3GPP access to the 5G core network is not allowed. Upon receiving the response message, the UE ends the session by sending a 5G-Stop message formatted in an Extensible Authentication Protocol (EAP) response. The EAP-Response/5G-Stop message includes a message-id field with a 5G Stop value.

12 Claims, 16 Drawing Sheets

(51) Int. Cl.
　　　*H04W 12/0471*　　(2021.01)
　　　*H04W 12/06*　　　(2021.01)
　　　*H04W 48/16*　　　(2009.01)
　　　*H04W 60/00*　　　(2009.01)
(52) U.S. Cl.
　　　CPC ........... *H04W 12/06* (2013.01); *H04W 48/16*
　　　　　　　　　(2013.01); *H04W 60/00* (2013.01)

(56) References Cited

U.S. PATENT DOCUMENTS

| | | | |
|---|---|---|---|
| 2013/0028172 | A1* | 1/2013 | Lim ..................... H04W 36/12 |
| | | | 370/315 |
| 2016/0029296 | A1 | 1/2016 | Bergstrom et al. |
| 2016/0127415 | A1 | 5/2016 | Dhammawat |
| 2017/0048202 | A1 | 2/2017 | McCann |
| 2017/0094512 | A1* | 3/2017 | Kiss ..................... H04W 12/06 |
| 2018/0167813 | A1 | 6/2018 | Li et al. |
| 2018/0220364 | A1 | 8/2018 | Li et al. |
| 2018/0279400 | A1* | 9/2018 | Faccin ............... H04W 68/005 |
| 2018/0376446 | A1* | 12/2018 | Youn ..................... H04W 8/20 |
| 2019/0021064 | A1 | 1/2019 | Ryu et al. |
| 2019/0037516 | A1 | 1/2019 | Kim et al. |
| 2019/0320381 | A1* | 10/2019 | Niemi .................. H04W 48/16 |
| 2021/0058776 | A1 | 2/2021 | Nair et al. |

FOREIGN PATENT DOCUMENTS

| | | |
|---|---|---|
| CN | 106572438 A | 4/2017 |
| KR | 1020180033263 A | 4/2018 |
| KR | 1020180057665 A | 5/2018 |
| RU | 2657869 C2 | 6/2018 |
| WO | WO 2009/126083 A1 | 10/2009 |
| WO | WO 2018/008944 A1 | 1/2018 |
| WO | WO 2018/088836 A1 | 5/2018 |
| WO | WO 2018/106617 A1 | 6/2018 |
| WO | WO 2020/006515 A1 | 1/2020 |

OTHER PUBLICATIONS

"3rd Generation Partnership Project; Technical Specification Group Core Network and Terminals; Non-Access-Stratum (NAS) protocol for 5G System (5GS); Stage 3 (Release 15)", 3GPP TS 24.501 v15.0.0, (Jun. 2018), 338 pages.
Examination Report for Australian Application No. 2019293046 dated Aug. 2, 2021, 3 pages.
Notice of Acceptance for Australian Application No. 2019293046 dated Mar. 16, 2022, 3 pages.
Office Action for Canadian Application No. 3,104,374 dated Mar. 17, 2022, 4 pages.
Office Action for Chilean Application No. 202003401 dated Jan. 17, 2022, 11 pages.
First Examination Report for Indian Application No. 202127003786 dated Jan. 7, 2022, 7 pages.
Office Action for Japanese Application No. 2020-573395 dated Feb. 16, 2022, 7 pages.
Notice of Allowance for Canadian Application No. 3,104,374 dated Mar. 1, 2023, 1 page.
Notice of Allowance for Chinese Application No. 201980044322.7 dated Mar. 30, 2023, 4 pages.
Notice of Allowance for Korean Application No. 10-2022-7028320 dated Mar. 7, 2023, 3 pages.
Office Action for Egyptian Application No. 2115/2020 dated Feb. 14, 2023, 5 pages.
Notice of Acceptance for Chilean Application No. 2020-003401 dated Jun. 17, 2022, 2 pages.
Notice of Acceptance for Russian Application No. 2020143958 dated Apr. 14, 2022, 13 pages.
Notice of Allowance for Korean Application No. 10-2021-7002859 dated May 18, 2022.
Office Action for Algerian Application No. DZ/P/2020/000689 dated Oct. 10, 2021, 2 pages.
Office Action for Korean Application No. 10-2021-7002859 dated Oct. 21, 2021, 9 pages.
Office Action for Russian Application No. 2020143958/07 dated Dec. 6, 2021, 5 pages.
Decision to Grant for Japanese Application No. 2020-573395 dated Jun. 15, 2023, 5 pages.
Office Action for Australian Application No. 2022204645 dated Jun. 22, 2023, 3 pages.
Office Action for Canadian Application No. 3,100,630 dated Jul. 24, 2023, 3 pages.
Office Action for Egyptian Application No. 2115/2020 dated Aug. 24, 2023, 5 pages.
"3rd Generation Partnership Project; Technical Specification Group Core Network and Terminals; Access to the 3GPP 5G Core Network (5GCN) via Non-3GPP Access Networks (N3AN); Stage 3 (Release 16)", 3GPP TS 24.502 v16.4.0, (Jun. 2020), 87 pages.
"3rd Generation Partnership Project; Technical Specification Group Core Network and Terminals; Access to the 3GPP Evolved Packet Core (EPC) via non-3GPP access networks; Stage 3 (Release 14)", 3GPP TS 24.302 v14.3.0, (Mar. 2017), 143 pages.
"3rd Generation Partnership Project; Technical Specification Group Core Network and Terminals; Non-Access-Stratum (NAS) protocol for 5G System (5GS); Stage 3 (Release 15)", 3GPP TS 24.501 v1.1.1, (May 2018), 297 pages.
"3rd Generation Partnership Project; Technical Specification Group Core Network and Terminals; Non-Access-Stratum (NAS) protocol for 5G System (5GS); Stage 3; (Release 16)", 3GPP TS 24.501 v16.5.1, (Jul. 2020), 709 pages.
"3rd Generation Partnership Project; Technical Specification Group Services and System Aspects; 3GPP System Architecture Evolution (SAE); Security aspects of non-3GPP accesses (Release 14)", 3GPP TS 33.402 v14.2.0, (Jun. 2017), 72 pages.
"3rd Generation Partnership Project; Technical Specification Group Services and System Aspects; Procedures for the 5G System; Stage 2 (Release 15)", 3GPP TS 23.502 v15.2.0, (Jun. 2018), 308 pages.
"3rd Generation Partnership Project; Technical Specification Group Services and System Aspects; System architecture for the 5G System (5GS); Stage 2 (Release 16)", 3GPP TS 23.501 v16.6.0, (Sep. 2020), 447 pages.
"3rd Generation Partnership Project; Technical Specification Group Services and System Aspects; System Architecture for the 5G System; Stage 2 (Release 15)", 3GPP TS 23.501 v15.2.0, (Jun. 2018), 217 pages.
Nokia et al., "Discussion on Handling When Signalling Ipsec SA Establishment is Not Accepted", 3GPP TSG-CT WG1 Meeting #112, C1-185448, (Aug. 20-24, 2018), 6 pages.
Olsson et al., "EPC and 4G Packet Networks", Academic Press, (2009), 585 pages.
Office Action for ARIPO Application No. AP/P/2020/012819 dated Jan. 15, 2023, 5 pages.
Office Action for European Application No. 19745834.2 dated Jan. 27, 2023, 5 pages.
Motorola Mobility et al., "Details of EAP-5G Solution for Registration via Untrusted Non-3GPP Access", SA WG2 Meeting #123, S2-176969, (Oct. 23-27, 2017), 12 pages.
"3rd Generation Partnership Project; Technical Specification Gorup Services and System Aspects; Security Architecture and Procedures for 5G System (Release 15)", 3GPP TS 33.501 v15.0.0 (Mar. 26, 2018), 128 pages.
"3rd Generation Partnership Project; Technical Specification Group Core Network and Terminals; Access to the 3GPP 5G Core Network (5GCN) via Non-3GPP Access Networks (N3AN); Stage 3 (Release 15)", 3GPP TS 24.502 v15.0.0 (Jun. 21, 2018), 36 pages.
"3rd Generation Partnership Project; Technical Specification Group Core Network and Terminals; Non-Access-Stratum (NAS) Protocol for 5G System (5GS); Stage 3 (Release 15)" 3GPP TS 24.501 v1.1.0 (May 9, 2018), 305 pages.
"3rd Generation Partnership Project; Technical Specification Group Services and System Aspects; 3GPP System Architecture Evolution (SAE); Security Aspects of Non-3GPP Accesses (Release 15)", 3GPP TS 33.402 v15.1.0 (Jun. 2018), 72 pages.

(56) References Cited

OTHER PUBLICATIONS

"3rd Generation Partnership Project; Technical Specification Group Services and System Aspects; Policy and Charging Control Framework for the 5G System; Stage 2 (Release 15)", 3GPP TS 23.503 v15.2.0 (Jun. 2018), 67 pages.
"3rd Generation Partnership Project; Technical Specification Group Services and System Aspects; Procedures for the 5G System; Stage 2 (Release 15)", 3GPP TS 23.502 v0.2.0 (Feb. 24, 2017), 72 pages.
"3rd Generation Partnership Project; Technical Specification Group Services and System Aspects; Procedures for the 5G System; Stage 2 (Release 15)", 3GPP TS 23.502 v15.0.0 (Dec. 2017), 258 pages.
"3rd Generation Partnership Project; Technical Specification Group Services and System Aspects; System Architecture for the 5G System; Stage 2 (Release 15)", 3GPP TS 23.501 v15.0.0 (Dec. 2017), 181 pages.
Arkko et al., "Network Working Group, Request for Comments: 5448; Improved Extensible Authentication Protocol Method for 3rd Generation Authentication and Key Agreement (EAP-AKA)", [online] [Retrieved Mar. 18, 2021]. Retrieved from the Internet: <URL:https://tools.ietf.org/pdf/rfc5448.pdf>. (May 2009), 29 pages.
International Search Report and Written Opinion for Patent Cooperation Treaty Application No. PCT/US2019/039992 dated Aug. 28, 2019, 8 pages.
Kaufman et al., "Internet Engineering Task Force (IETF) Request for Comments: 7296; Internet Key Exchange Protocol Version 2 (IKEv2)", [online] [Retrieved Mar. 18, 2021]. Retrieved from the Internet: <URL:https://tools.ietf.org/pdf/rfc7296.pdf>. (Oct. 2014), 142 pages.
Nokia et al., "Non-3GPP Access to 5GCN Not Allowed", 3rd Generation Partnership Project (3GPP)Draft, 3GPP TSG-CT WG1 Meeting #111bis, C1-184875 (Jul. 9-13, 2018), 3 pages.
Nokia, "Observations on the Solution for Untrusted Non-3GPP Access in S2-174885; S3-171943", 3rd Generation Partnership Project (3GPP) Draft, 3GPP TSG SA WG3 (Security) Meeting #88, S3-171943 (Aug. 7-11, 2017), 4 pages.
Aboba et al., "Extensible Authentication Protocol (EAP)", Network Working Group, Request for Comments 3748 (RFC 3748), (Jun. 2004), 67 pages.
Motorola Mobility et al., "Details of EAP-5G Solution for Registration Via Untrusted Non-3GPP Access", SA WG3 Meeting #88-Bis, S3-172511, (Oct. 9-13, 2017), 12 pages.
Office Action for ARIPO Application No. AP/P/2020/012819 dated Jul. 19, 2022, 4 pages.
Office Action for Chinese Application No. 201980044322.7 dated Sep. 8, 2022, 23 pages.
Office Action for Japanese Application No. 2020-573395 dated Nov. 9, 2022, 8 pages.
Office Action for Singapore Application No. 11202012478Q dated Sep. 1, 2022, 11 pages.
Office Action for Vietnam Application No. 1-2021-00203 dated Jul. 9, 2021, 2 pages.
Notice of Allowance for Korean Application No. 10-2023-7018955 dated Feb. 15, 2024, 5 pages.
Office Action for Mexico Application No. MX/a/2021/000159 dated Mar. 1, 2024, 6 pages.
Notice of Acceptance for Australian Application No. 2022204645 dated Jun. 4, 2024, 3 pages.
Notice of Allowance for Mexican Application No. MX/a/2021/000159 dated May 22, 2024, 6 pages.
Notice of Grant for Colombian Application No. NC2021/0000912 dated Jun. 27, 2024, 20 pages.
Office Action for Australian Application No. 2022204645 dated Oct. 13, 2023, 3 pages.
Office Action for Canadian Application No. 3,104,374 dated Dec. 19, 2023, 4 pages.
Office Action for Colombian Application No. NC2021/0000912 dated Nov. 30, 2023, 22 pages.
Office Action for Egyptian Application No. 2115/2020 dated Jan. 29, 2024, 5 pages.
Office Action for Indonesian Application No. P00202100194 dated Sep. 25, 2023, 6 pages.
Office Action for Vietnamese Application No. 1-2021-00203 dated Jan. 30, 2024, 4 pages.
Office Action for Japanese Application No. 2023-116614 dated Jun. 6, 2024, 10 pages.
Samsung R&D Institute UK et al., "Change "N1 mode radio capability" to N1 mode capability for 3GPP access", 3GPP TSG-CT WG1 Meeting #111, C1-183524, (May 21-25, 2018), 11 pages.
Decision to Grant for Japanese Application No. 2023-116614 dated Nov. 25, 2024, 4 pages.
Invitation to Amend for Singapore Application No. 11202012478Q dated Jul. 22, 2024, 5 pages.
Notice of Allowance for Singapore Application No. 11202012478Q dated Sep. 30, 2024, 4 pages.
Office Action for Egyptian Application No. 2115/2020 dated Aug. 11, 2024, 10 pages.
Office Action for Vietnamese Application No. 1-2024-04106 dated Jul. 31, 2024, 2 pages.
Office Action for Egyptian Application No. 2115/2020 dated Mar. 16, 2025, 6 pages.
Office Action for Brazilian Application No. BR112020026940-9 dated Mar. 19, 2025, 8 pages.
Office Action for Malaysian Application No. PI2020006761 dated Apr. 25, 2025, 4 pages.

* cited by examiner

Architecture of a 5G Core Network for Non-3GPP Access

Message Flow when User Plane IPsec SA Establishment for a PDU session is not accepted 5GMM Cause Information Element 5GMM Cause Information Element Values

METHOD AND APPARATUS FOR HANDLING AUTHENTICATION FAILURE DURING SECURITY ASSOCIATION ESTABLISHMENT

CROSS REFERENCE TO RELATED APPLICATIONS

The present application is a National Stage Entry of International Patent Application No. PCT/US2019/039992, filed Jun. 28, 2019, entitled "Method And Apparatus For Handling Authentication Failure During Security Association Establishment." which claims priority under 35 U.S.C. § 119 to U.S. Provisional Application No. 62/692,722 entitled, "Method and Apparatus For Handling Authentication Failure During Security Association Establishment," filed Jun. 30, 2018, the entire disclosures of each of which are hereby expressly incorporated by reference herein.

TECHNICAL FIELD

This application relates generally to access networks, and more specifically to session establishment by user equipment in an access network when security association establishment is not accepted.

DESCRIPTION OF RELATED ART

The statements in this section provide a description of related art and are not admissions of prior art. User equipment (UE), such as smart phones, smart tablets, laptops, computers, smart watches, etc., often include capability for both wireless local area network (WLAN) connectivity (such as IEEE 802.11x compliant WLAN connectivity) and radio access network connectivity (such as technologies wholly or partially compliant with the 3rd generation partnership project (3GPP) set of standards including EVDO, UMTS, HSPA, and LTE). The UE may thus connect to the 3GPP evolved packet core (EPC) network using two types of access technologies composed of 3GPP access networks and non-3GPP access networks.

In general, 3GPP access networks are wholly or partially compliant with technologies specified by the 3GPP set of standards that include, e.g., GPRS, UMTS, EDGE, HSPA, LTE and LTE Advanced. Non-3GPP access networks are wholly or partially compliant with technologies that are not specified by the 3GPP set of standards. They include technologies such as cdma2000, WLAN (such as IEEE 802.11x compliant WLAN) or fixed networks.

The 3GPP set of standards specifies "non-3GPP" access technologies with different security mechanisms: untrusted access networks and trusted access networks. Untrusted access networks include access networks that may pose a higher security risk (for example, a public WLAN or femtocell access network). Trusted access networks include access networks that the network operator considers have a level of trust from a security stand point and may interface directly with the EPC network.

In the new set of 5G standards, a Non-3GPP Access Network (N3AN) is treated as a 5G Access Network and part of the 5G System (5GS). For untrusted non-3GPP access, a Non-3GPP Interworking Function (N3IWF) provides termination of signaling interfaces for control-plane and user-plane respectively, same as an NG-RAN node. Thus, 5G capable UEs can access the 5G core network (5GCN) by connecting to Non-3GPP Access Network as a 5G Access Network via the N3IWF. The N3IWF relays uplink and downlink control-plane signaling between the UE and the 5GCN. In addition, the N3IWF provides user plane connection between the UE and the 5GCN for sessions over non-3GPP access networks.

Currently, the signaling procedures between the UE and N3IWF are specified when certain security authentication establishment is accepted by the network. However, there is no method available to handle the case when the security association establishment is not accepted by the network. Similarly, for user plane connections, a method needs to be specified to handle the case when the user plane security association establishment is not accepted by the network.

Therefore, a need exists to provide a system and method that supports handling failure during security association establishment for access to 5GCN via non-3GPP access networks. Other needs and benefits are also provided with embodiments described herein.

SUMMARY

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one aspect, an interworking function node for managing a network connection over an untrusted access network to a core network includes a first network interface configured to communicate with user equipment (UE) over the untrusted access network and a second network interface configured to communicate with one or more nodes in the core network. The interworking function node includes a processing device configured to process a request for a connection establishment to the core network from the UE in the untrusted access network and generate a request to the core network; determine the connection establishment is not accepted by the core network; and generate a response message to the UE, wherein the response message includes an error indicating that the connection establishment over the untrusted access network is not allowed by the core network.

In another aspect, an Access and Mobility Management function (AMF) for handling a network connection request from the interworking function node includes a network interface configured to communicate with an interworking function node and an authentication function in a core network. The AMF also includes a processing device configured to process a request for authentication and secure connection establishment for a UE over an untrusted access network; generate a request for authentication and subscription check towards an Authentication Server Function (AUSF); determine a response for the authentication and subscription check indicates an authentication failure; and generate a response message of authentication and secure connection establishment by including in the response message a cause value indicating access to the core network is not allowed over the untrusted access network.

In another aspect, user equipment (UE) includes a network interface configured to communicate with an interworking function node over an untrusted access network. The UE includes a processing device configured to generate a registration request for secure session establishment to a core network; process a response message from the interworking function node; and determine from the response message that the connection establishment over the untrusted access network is not allowed by the core network.

In one or more of the above aspects, the processing device in the interworking function node is configured to receive a request for authentication and secure connection establishment from the UE over the untrusted access network; generate a request for authentication and subscription check and transmit the request for authentication and subscription check over the second interface towards Access and Mobility management Function (AMF); receive a response for authentication and subscription check from the AMF; and generate an Internet Key Exchange (IKE) response message to the UE with an NAS payload including the error indicating that the connection establishment over the untrusted access network is not allowed by the core network.

In one or more of the above aspects, the processing device in the interworking function node is configured to receive a response from the Access and Mobility Management Function encapsulating a Registration Reject message including a 5GMM cause value indicating Non-3GPP access to 5GCN not allowed and generate an Internet Key Exchange (IKE) response message with the payload including a message type indicating that the connection establishment is not accepted by the core network.

In one or more of the above aspects, the processing device in the interworking function node is configured to generate the Internet Key Exchange (IKE) response message with a notify payload including a private notify message type indicating a failure reason.

In one or more of the above aspects, the processing device in the interworking function node is configured to generate the IKE response message by generating the IKE response message with a notify payload including a private notify message type indicating that untrusted non-3GPP access to the 5GCN is not allowed.

In one or more of the above aspects, the processing device in the interworking function node is configured to transmit the response message to the UE, wherein the response message indicates that the connection establishment is not accepted by the core network; receive a stop message from the UE; and generate a failure message to the UE.

In one or more of the above aspects, the processing device in the interworking function node is configured to process the stop message from the UE, wherein the stop message includes a 5G-Stop message format having a message identifier field and wherein the message identifier field includes a 5G-Stop identifier.

In one or more of the above aspects, the request for the connection establishment from the UE in the untrusted access network includes an IKE request message to initiate an IPsec Security Association (SA) with the core network.

In one or more of the above aspects, the core network is a 5GCN and the untrusted access network is a non-3GPP access network.

In one or more of the above aspects, the processing device in AMF is configured to encapsulate in the response message a Registration Reject message that includes the cause value, wherein the cause value includes a 5GMM cause value indicating Non-3GPP access to the 5GCN is not allowed.

In one or more of the above aspects, the processing device in AMF is configured to generate an Extensible Authentication Protocol (EAP) failure indication in the response message.

In one or more of the above aspects, the processing device in the user equipment is configured to generate a stop message indicating an end to the registration request for secure session establishment to the 5GCN and transmit the stop message over the non-3GPP access network to the interworking function node.

In one or more of the above aspects, the processing device in the user equipment is configured to generate the stop message as an EAP-Response formatted message including a message identifier field set to 5G-Stop.

In one or more of the above aspects, the processing device in the user equipment is configured to process an EAP failure message from the interworking function node; and perform a security association deletion procedure.

In one or more of the above aspects, the processing device in the user equipment is configured to re-attempt registration with the 5GCN by generating a second registration request for secure session establishment to the 5GCN and determine from a second response message from the interworking function node that the connection establishment over the untrusted access network is successful.

In one or more of the above aspects, the processing device in the user equipment is configured to generate the second registration request for secure session establishment to the 5GCN with updated parameters.

Additional aspects will be set forth, in part, in the detailed description, figures and any claims which follow, and in part will be derived from the detailed description. It is to be understood that both the foregoing general description and the following detailed description is exemplary and explanatory only, and the claims are not restricted to the embodiments disclosed.

BRIEF DESCRIPTION OF THE SEVERAL VIEWS OF THE DRAWINGS

Some embodiments of apparatus and/or methods in accordance with embodiments of the disclosure are now described, by way of example only, and with reference to the accompanying drawings, in which.

DETAILED DESCRIPTION

The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended expressly to be only for pedagogical purposes to aid the reader in understanding the principles of the embodiments and the concepts contributed by the inventor to furthering the art and are to be construed as being without limitation to such specifically recited examples and conditions. Moreover, all statements herein reciting principles, aspects, and embodiments, as well as specific examples thereof, are intended to encompass equivalents thereof.

Some of the abbreviations that are described herein are expanded below for convenience:

5GC 5G Core
5GCN 5G Core Network
5GS 5G System
5G-AN 5G Access Network
5GMM 5GS Mobility Management
5G-GUTI 5G Globally Unique Temporary Identifier
5G-S-TMSI 5G S-Temporary Mobile Subscription Identifier
5QI 5G QOS Identifier
AMF Access and Mobility Management Function
AUSF Authentication Server Function
EAP Extensible Authentication Protocol
HPLMN Home Public Land Mobile Network
IKEv2 Internet Key Exchange v2
IMSI International Mobile Subscriber Identity
IMEI International Mobile Equipment Identity
IPsec Internet protocol security
MCM Multi-Connection Mode
N3IWF Non-3GPP Interworking Function
NAS Non-Access Stratum
PDN Packet Data Network
PLMN Public Land Mobile Network
QoS Quality of Service
SA Security Association
SCM Single-Connection Mode
UDM Unified Data Management
UE User Equipment
UICC Universal Integrated Circuit Card
USIM UMTS Subscriber Identity-Mobile Module One or more embodiments are described herein that provide a system and method for providing network services to unauthenticated user equipment. For example, various methods are described for session establishment for an unauthenticated UE in a non-3GPP access network.

Figure 1:
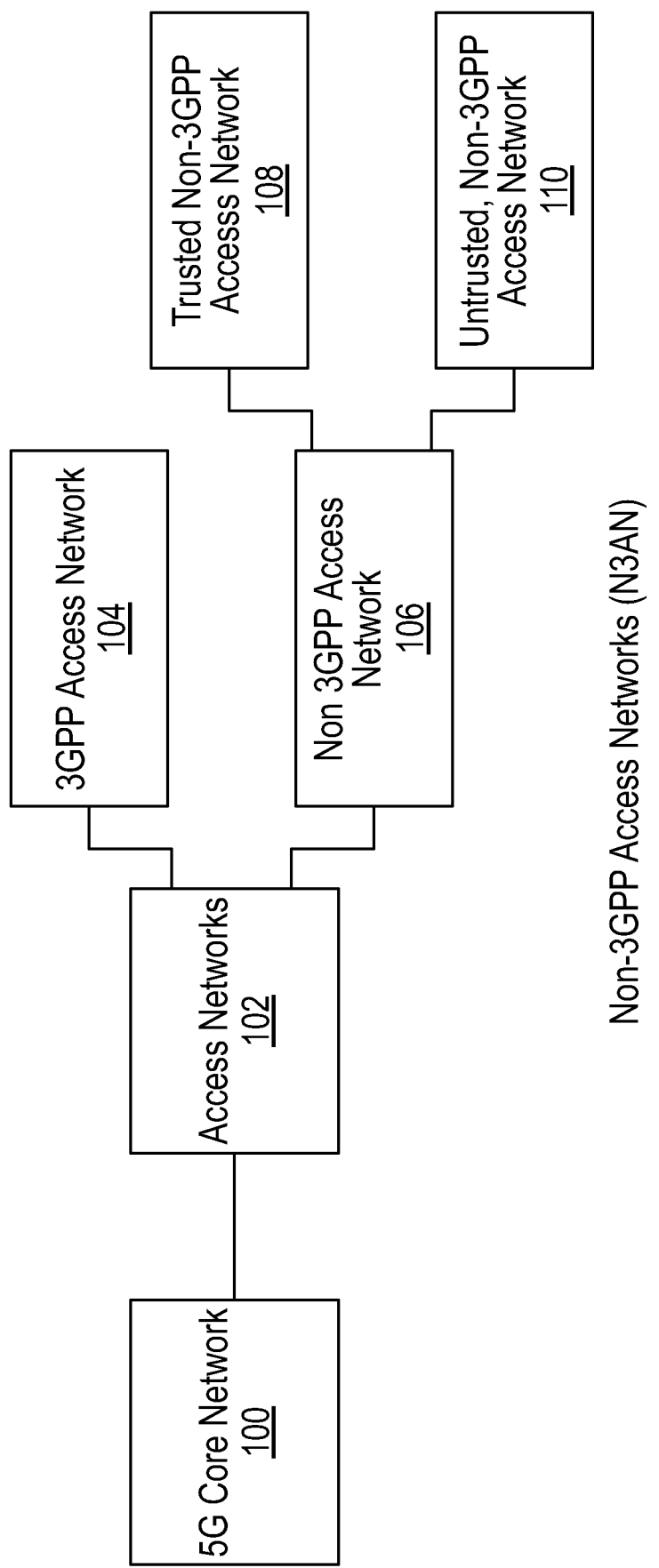
FIG. 1 illustrates a schematic block diagram of an embodiment of types of access networks.

FIG. 1 illustrates a schematic block diagram of an embodiment of types of access networks for a 5G core network (5GCN) 100 that is fully or partially compliant with the 3rd Generation Partnership Project (3GPP) set of standards for the 5G system, such as Technical Specification (TS) 23.501 "System Architecture for the 5G System", Technical Specification (TS) 23.502 defining procedures for the 5G System, and Technical Specification (TS) 23.503 defining a Policy and Charging Control Framework for the 5G System.

The 5GCN 100 is communicatively coupled to one or more access networks 102. In an embodiment, the access networks 102 may include one or more 3GPP access networks 104 or one or more non-3GPP access networks 106. The 3GPP access networks 104 are wholly or partially compliant with technologies specified by the 3GPP set of standards and include, e.g. GPRS, UMTS, EDGE, HSPA, LTE and LTE Advanced. The non-3GPP access networks 106 are wholly or partially compliant with technologies that are not specified by the 3GPP set of standards. The non-3GPP access networks 106 may be so specified in the 3GPP set of standards. The non-3GPP access networks 106 may include one or more non-3GPP trusted access networks 108 or one or more non-3GPP, untrusted access networks 110.

The trusted non-3GPP access networks 108 are operator-built or operator supported wireless local area networks (WLAN), such as an IEEE 802.11x compliant WLAN network, with encryption and a secure authentication method. In one embodiment, the trusted, non-3GPP access network 108 supports the following example features: 802.1x-based authentication which in turn also requires encryption of the radio access network (RAN), 3GPP-based network access using EAP method for authentication, and IPv4 and/or IPv6 protocols. However, an operator may determine that other types of non-3GPP access networks with different types of security are to be considered trusted. The untrusted non-3GPP access networks 110 include non-3GPP access networks that are unknown to an operator or do not include supported authentication standards. For example, an untrusted non-3GPP access network may include a home or public WLAN, such as an IEEE 802.11x compliant WLAN network that is open to the public, home WLAN or another non-operator originated and managed.

Figure 2:
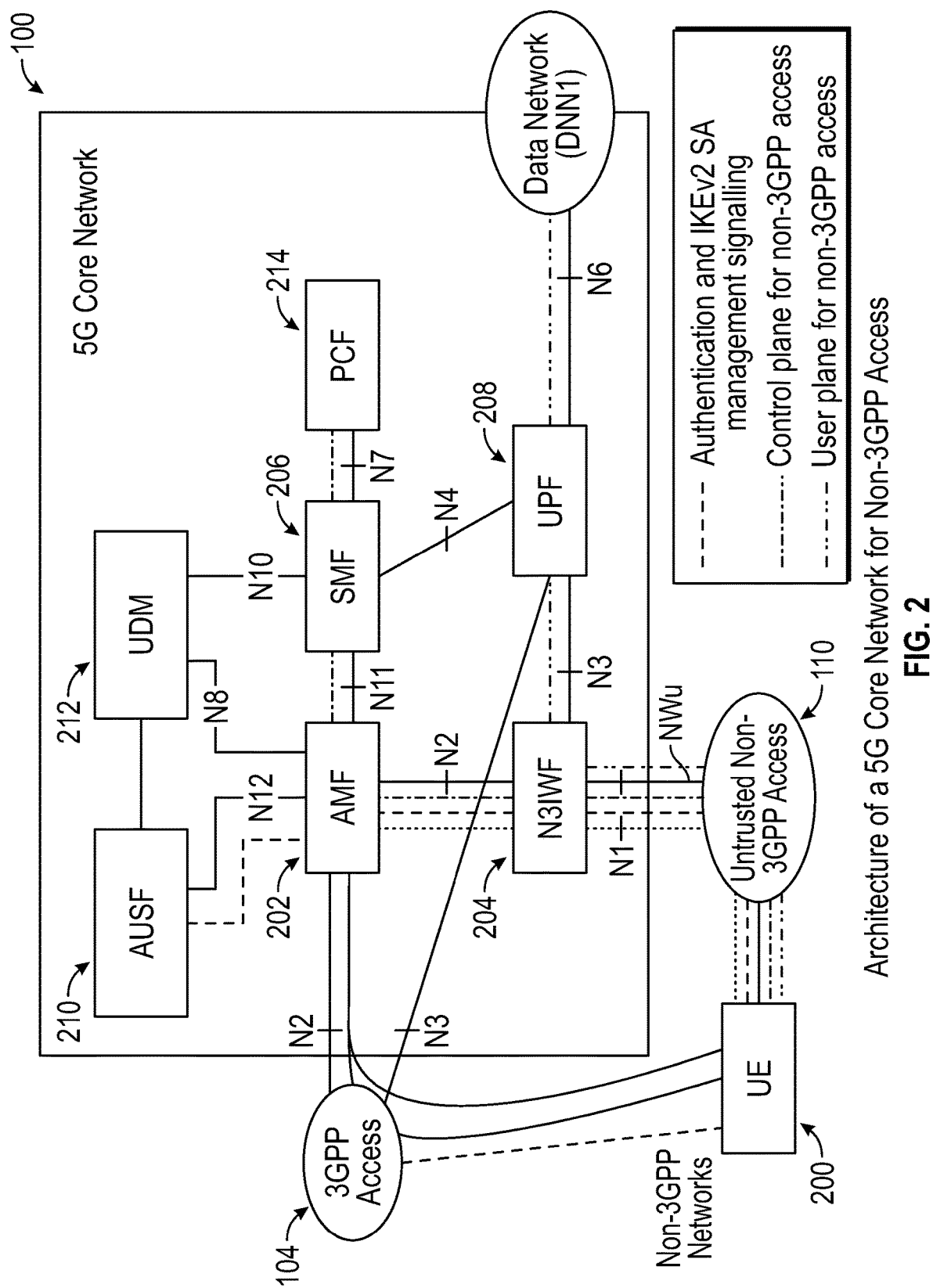
FIG. 2 illustrates a schematic block diagram of an embodiment of a 5G System Architecture for non-3GPP access.

FIG. 2 illustrates a schematic block diagram of an embodiment of a 5G System Architecture for non-3GPP access. This architecture is described in more detail in the technical standard 3GPP TS 23.501, Release 15 (December 2017) entitled, "System Architecture for the 5G System," which is incorporated by reference herein.

Non-3GPP access networks are connected to the 5GCN 100 via a Non-3GPP Interworking Function (N3IWF). The N3IWF 204 interfaces the 5GCN 100 control plane (CP) and user plane (UP) functions via N2 and N3 interfaces, respectively. A UE 200 establishes an IP security (IPSec) tunnel with the N3IWF 204 to attach to the 5GCN 100 over the untrusted non-3GPP access network 110. The UE 200 is authenticated by and attached to the 5GCN 100 during the IPSec tunnel establishment procedure. Further details for UE 200 attachment to 5GCN 100 over untrusted non-3GPP access 110 are described in 3GPP TS 23.502, Release 15 (December 2017) entitled, "Procedures for the 5G System," which is hereby incorporated by reference herein.

The 5GCN 100 includes a Home Public Land Mobile Network or Equivalent Home PLMN (HPLMN) including an Access and Mobility Management function (AMF) 202. The AMF 202 provides for the termination of the control plane interface (N2) and termination of NAS (N1) set of protocols and NAS ciphering and integrity protection. The AMF 202 also provides registration and connection management. The AMF 202 may include various functionality to support non-3GPP access networks 110. For example, the AMF 202 may provide support of N2 interface control protocols with the N3IWF 204 as well as support of NAS signalling with a UE 200 over the N3IWF 204. In addition, the AMF 202 may provide support of authentication of UEs 200 connected over the N3IWF 204 and management of mobility, authentication, and separate security context state(s) of a UE 200 connected via the non-3GPP access or connected via 3GPP and non-3GPP accesses simultaneously. Non-Access Stratum (NAS) is a set of protocols in 5G standards. The 5G NAS (Non-Access Stratum) includes procedures related to 5GMM (5GS Mobility Management) and 5GSM (5G Session Management) on the 5GS (5G system). The NAS is used to convey control signalling between the User Equipment (UE) and the 5GCN functions. A version of the 5G NAS protocol is defined in 3GPP TS 24.501: "Access-Stratum (NAS) protocol for 5G System (5GS)" Version 1.1, May 9, 2018, which is hereby incorporated by reference herein.

The Session Management function (SMF) 206 includes session management functionality, e.g. session establishment, modify and release, including tunnel maintenance between the UPF 208 and AN node. The SMF 206 also provides for UE IP address allocation & management (including optional Authorization) and DHCPv4 (server and client) and DHCPv6 (server and client) functions.

The user plane function (UPF) 208 provides an external PDU Session point of interconnect to Data Network and Packet routing & forwarding. The UPF 208 also supports the User Plane part of policy rule enforcement, e.g. gating, redirection, traffic steering, etc.

The Policy Control Function (PCF) 214 supports a unified policy framework to govern network behaviour. The Unified Data Management (UDM) 212 includes support for generation of 3GPP AKA Authentication Credentials, Access authorization based on subscription data (e.g. roaming restrictions), and UE's Serving NF Registration Management (e.g. storing serving AMF for UE, storing serving SMF for UE's PDU Session). It also provides SMS and subscription management. To provide this functionality, the UDM 212 uses subscription data (including authentication data) that may be stored in the UDR. Another module provides authentication server function (AUSF) 210.

The functionality of N3IWF 204 in case of untrusted non-3GPP access 110 includes the support of IPsec tunnel establishment with the UE 200. The N3IWF 204 terminates the IKEv2/IPsec protocols with the UE 200 over an NWu interface and relays over an N2 interface the information needed to authenticate the UE 200 and authorize its access to the 5GCN 100. The N3IWF 204 provides termination of N2 and N3 interfaces to 5GCN 100 for control-plane and user-plane respectively. The N3IWF 204 relays uplink and downlink control-plane NAS (N1) signaling between the UE 200 and AMF 202. The N3IWF 204 provides handling of N2 signaling from SMF 206 (relayed by AMF 202) related to PDU Sessions and QoS. The N3IWF 204 further provides for the establishment of IPsec Security Association (IPsec SA) to support PDU Session traffic. The N3IWF 204 also provides for relaying uplink and downlink user-plane packets between the UE 200 and UPF 208.

Figure 3:
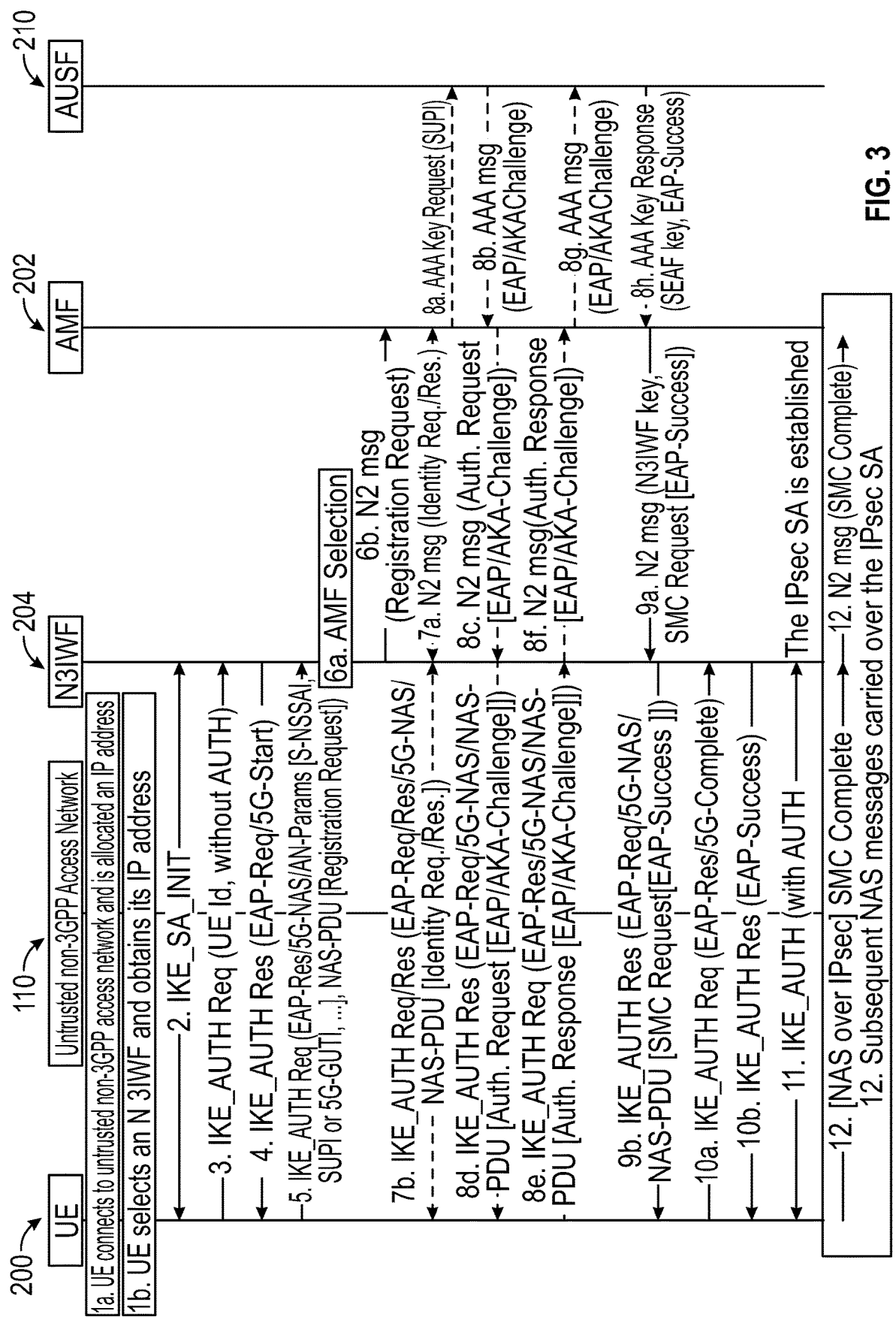
FIG. 3 illustrates a logical flow diagram illustrating an embodiment of a method for a UE to register to a 5GCN via an untrusted non-3GPP access network.

FIG. 3 illustrates a logical flow diagram illustrating an embodiment of a method for a UE 200 to register to a 5GCN 100 via an untrusted non-3GPP access 110. The method includes a vendor-specific Extensible Authentication Protocol (EAP) called "EAP-5G". EAP is defined in IETF RFC 3748: "Extensible Authentication Protocol (EAP)" dated June 2004. EAP-5G is a vendor-specific EAP for 5GS (EAP-5G) that is used to encapsulate NAS messages between the UE 200 and the N3IWF 204. The EAP-5G packets utilize the "Expanded" EAP type and the existing 3GPP Vendor-Id registered with IANA under the SMI Private Enterprise Code registry (i.e. 10415). In an embodiment, the EAP-5G is utilized only for encapsulating NAS messages (not for authentication).

If the UE 200 needs to be authenticated, an EAP-AKA' mutual authentication is executed between the UE 200 and AUSF 210 as described herein below. In Registration and subsequent Registration procedures via untrusted non-3GPP access networks 110, the NAS messages are exchanged between the UE 200 and the AMF 202.

In step 1, the UE 200 connects to an untrusted non-3GPP access network 110 with procedures outside the scope of 3GPP (such as specified in IEEE 802.11 WLAN protocols) and is assigned an IP address. Any non-3GPP authentication method can be used, e.g. no authentication (in case of a free WLAN), Extensible Authentication Protocol (EAP) with pre-shared key, username/password, etc. When the UE 200 decides to attach to the 5GCN 100, the UE 200 selects an N3IWF 204 in a 5G PLMN.

In step 2, the UE 200 proceeds with the establishment of an IPsec Security Association (SA) with the selected N3IWF 204 by initiating an Internet Key exchange (IKE) protocol initial exchange, e.g. as described in IETF RFC 7296, "Internet Key Exchange Protocol Version 2 (IKEv2)," (October 2014). After step 2, subsequent IKE messages are encrypted and integrity protected by using the IKE SA established in this step.

In step 3, the UE 200 shall initiate an IKE_AUTH exchange by sending an IKE_AUTH request message. The AUTH payload is not included in the IKE AUTH request message, which indicates that the IKE AUTH exchange uses Extensible Authentication Protocol (EAP) signaling protocols, e.g. EAP-5G signaling (such as EAP-AKA' described in IETF RFC 5448, "Improved Extensible Authentication Protocol Method for 3rd Generation Authentication and Key Agreement (EAP-AKA')," Mar. 5, 2018 and incorporated by reference herein).

In step 4, the N3IWF 204 responds with an IKE_AUTH response message which includes an EAP-Request/5G-Start packet. The EAP-Request/5G-Start packet informs the UE 200 to initiate an EAP-5G session, i.e. to start sending NAS messages encapsulated within EAP-5G packets.

In step 5, the UE 200 generates and transmits a registration request for the 5GCN 100, e.g. an IKE_AUTH request which includes an EAP-Response/5G-NAS packet that includes the Access Network parameters (AN-Params) and a NAS Registration Request message. The UE thus acknowledges start of the EAP-5G session by sending the EAP-Response/5G-NAS packet which includes for example: a) a NAS-PDU field that contains a NAS message, for example, a REGISTRATION REQUEST message; and b) an AN-parameters field that contains access network parameters, such as SUPI or 5G-GUTI, the Selected Network and S-NSSAI etc. (see 3GPP TS 23.502). The AN-Parameters are used by the N3IWF 204 for selecting an AMF 202 in the 5GCN 100.

In step 6a, the N3IWF 204 selects an AMF 202 in the 5GCN 100 based on the received AN-Parameters and local policy. The N3IWF 204 then forwards the Registration Request received from the UE 200 to the selected AMF 202 in step 6b. The N3IWF 204, on reception of NAS messages from the AMF 202, includes the NAS message within an EAP-Request/5G-NAS message to the UE 200. The EAP-Request/5G-NAS message includes an NAS-PDU field that contains a NAS message. Further NAS messages between the UE 200 and the AMF 202, via the N3IWF 204, are inserted in NAS-PDU fields of an EAP-Response/5G-NAS message (UE to N3IWF direction) and EAP-Request/5G-NAS (N3IWF to UE direction) message.

In steps 7a and 7b, the selected AMF 202 may decide to request the UE's permanent identity (SUPI) by sending a NAS Identity Request message to UE 200 via the N3IWF 204. This NAS message and all subsequent NAS messages are sent to UE 200 by the N3IWF 204 encapsulated within EAP/5G-NAS packets.

In step 8, the AMF 202 may decide to authenticate the UE 200. In this case, the AMF 202 shall select an AUSF 210 by using the SUPI or the encrypted SUPI of the UE 200, and shall send a key request to the selected AUSF 210 at step 8a. The AUSF 210 may initiate an EAP-AKA' authentication in step 8b, as specified in TS 3GPP TS 33.501: "Security Architecture and Procedures for 5G System" (Release 15, Mar. 26, 2018), which is incorporated by reference herein. The EAP-AKA' challenge packets are encapsulated within NAS authentication messages to the N3IWF in step 8c and the NAS authentication messages are encapsulated within EAP/5G-NAS packets in step 8d. The UE 200 generates an authentication response to the EAP-AKA challenge in step 8e which is forwarded by the N3IWF 204 to the AMF in step 8f. The AUSF 210 then receives the authentication response from the AMF in step 8g.

After a successful authentication of the UE 200, in step 8h, the AUSF 210 sends the anchor key (SEAF key) to AMF 202 which is used by AMF 202 to derive NAS security keys and a security key for N3IWF 204 (N3IWF key). The UE 200 also derives the anchor key (SEAF key) and from that key it derives the NAS security keys and the security key for N3IWF 204 (N3IWF key). The N3IWF key is used by the UE 200 and N3IWF 204 for establishing the IPsec Security Association (in step 11). The AUSF 210 includes the SUPI (unencrypted), if in step 8a the AMF 202 provided to AUSF 210 an encrypted SUPI.

At steps 9a and 9b, the AMF 202 sends a Security Mode Command (SMC) request to the UE 200 to activate NAS security. This request is first sent to N3IWF 204 (within an N2 message) together with the N3IWF key. If an EAP-AKA' authentication was successfully executed in step 8, then in step 9a the AMF 202 encapsulates the EAP-Success received from AUSF 210 within the SMC Request message.

In step 10a, the UE 200 completes the EAP-AKA' authentication (if initiated in step 8) and creates a NAS security context and an N3IWF key. After the N3IWF key is created in the UE 200, the UE 200 requests the completion of the EAP-5G session by sending an EAP-Response/5G-Complete packet. This triggers the N3IWF 204 to send an EAP-Success to UE 200 in step 10b, assuming the N3IWF 204 has also received the N3IWF key from AMF 202. This completes the EAP-5G session and no further EAP-5G packets may be exchanged. If the N3IWF 204 has not received the N3IWF key from AMF 202, the N3IWF 204 responds with an EAP-Failure.

In step 11, the IPsec SA is established between the UE 200 and N3IWF 204 by using the common N3IWF key that was created in the UE 200 and was received by N3IWF 204 in step 9a. This IPsec SA is referred to as the "signaling IPsec SA". After the establishment of the signaling IPsec SA all NAS messages between the UE 200 and N3IWF 204 are exchanged via this IPsec SA. The signaling IPsec SA shall be configured to operate in transport mode. The SPI value is used to determine if an IPsec packet carries a NAS message or not.

At step 12, the UE 200 sends the SMC Complete message over the established signaling IPsec SA and all subsequent NAS messages are exchanged between the UE 200 and AMF 202 via this IPsec SA.

As described above, the UE 200 and N3IWF 204 have a defined method when IKE SA and signaling IPsec SA establishment over non-3GPP access network 110 is accepted by the 5GCN 100. However, there is no system or method available to handle the case when IKE SA and signaling IPsec SA establishment is not accepted by the 5GCN 100. In addition, for the user plane, a system and method need to be specified to handle the case when the user plane IPsec SA establishment is not accepted by the 5GCN 100. In general, methods and systems need to be established for handling rejection of non-3GPP access to the 5GCN 100.

Figure 4:
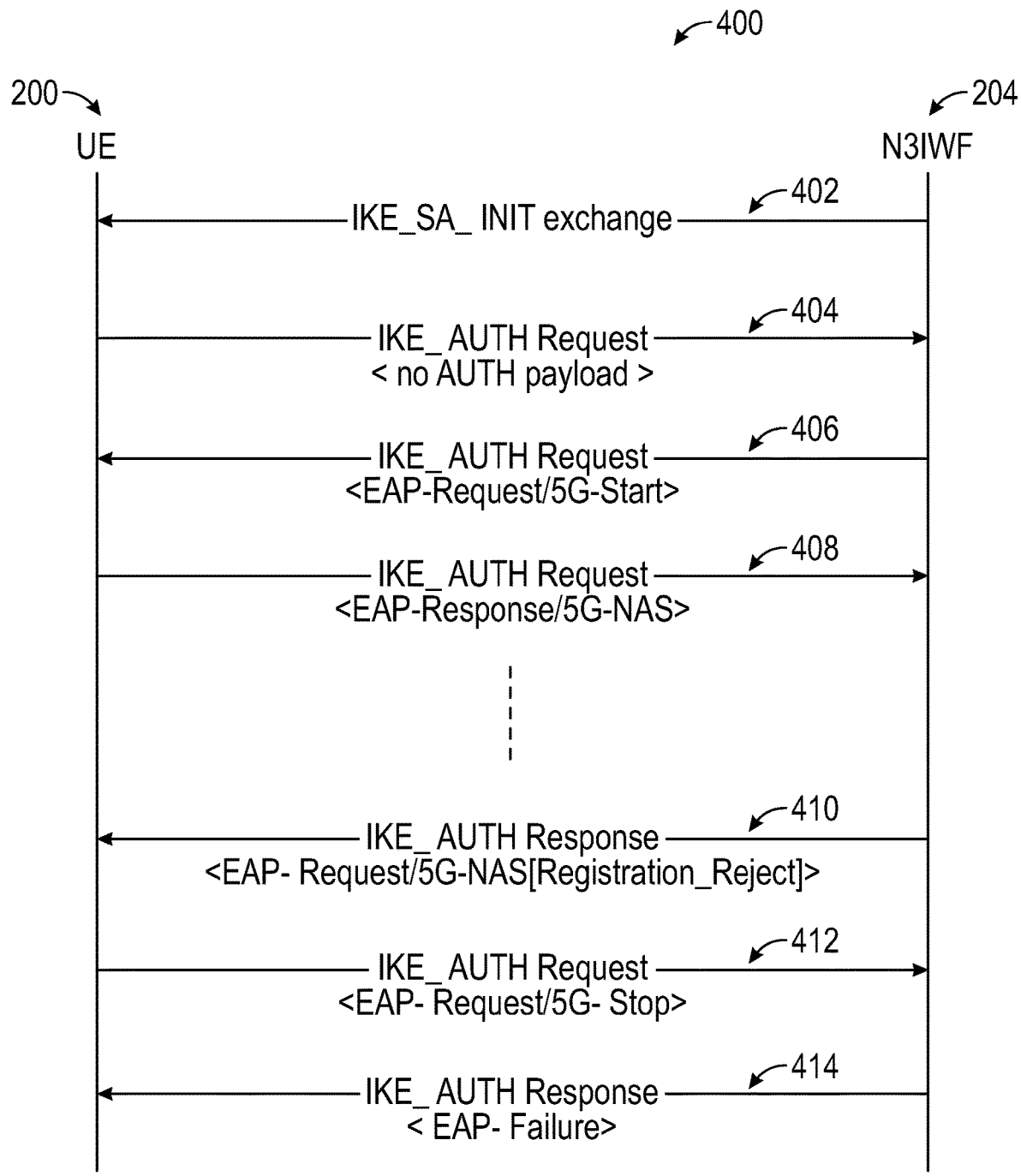
FIG. 4 illustrates a logical flow diagram of an embodiment of a method for handling embodiments in which IKE SA and signalling IPsec SA establishment is not accepted.

Embodiment—Process and Protocol Enhancements to Handle the Case when UE Registration Over Non-3GPP Access Network is not Accepted by the 5G Core Network FIG. 4 illustrates a logical flow diagram of an embodiment of a method 400 to handle the case when IKE SA and signalling IPsec SA establishment is not accepted. In step 402, the UE 200 proceeds with a request for establishment of an IPsec Security Association (SA) with the selected N3IWF 204. The UE 200 initiates the IPsec SA establishment using the Internet Key Exchange (IKE) protocol described in IETF RFC 7296 "Internet Key Exchange Protocol Version 2 (IKEv2)," (October 2014). The UE 200 sends an IKE_AUTH request message in step 404. In step 406, the N3IWF 204 responds with an IKE_AUTH response message that includes an EAP-Request/5G-Start packet. The EAP-Request/5G-Start packet informs the UE 200 to initiate an EAP-5G session, i.e. to start sending NAS messages encapsulated within EAP-5G packets.

In step 408, the UE 200 generates a registration request for the 5GCN 100, e.g. an IKE_AUTH request which includes an EAP-Response/5G-NAS packet that includes the Access Network parameters (AN-Params) and a NAS Registration Request message. The AN-Params contain information (e.g. SUPI or 5G-GUTI, the Selected Network and NSSAI) that is used by the N3IWF 204 for selecting an AMF 202 in the 5GCN 100.

In some instances, the UE registration over non-3GPP access is rejected, e.g. due to authentication failure such as the EAP-AKA' authentication was not successful. Then the IKE SA and signalling IPsec SA establishment is not accepted by the 5GCN 100. In an embodiment, the AMF 202 generates a REGISTRATION REJECT message, and the N3IWF 204 sends an EAP-Response/5G-NAS message to the UE which includes a NAS-PDU field that contains the REGISTRATION REJECT message in step 410.

Upon receiving the registration reject message, the UE 200 ends the registration request by generating and sending an EAP-Response/5G-Stop message (encapsulated in an IKE_Auth request) in step 412. The UE 200 receives from the N3IWF 204 an IKE_AUTH response with an EAP Failure message in step 414. On reception of the EAP-Failure message from the N3IWF 204, the UE 200 performs IKEv2 SA deletion procedure. The UE 200 does not re-initiate the IKE SA and signalling IPsec SA establishments to a N3IWF 204 from the same PLMN until switching off or the UICC containing the USIM is removed.

When the UE 200 registration over the non-3GPP access network 110 is rejected, the AMF 202 transmits a REGISTRATION REJECT message to the N3IWF 204. In response, the N3IWF 204 transmits an EAP-Response/5G-NAS message to the UE 200 that includes a NAS-PDU field including a REGISTRATION REJECT message. The subsequent UE 200 response may be different depending on the reason for the registration rejection. For recoverable errors, such as syntax error or certain temporary rejection reasons, the UE 200 may attempt to initiate registration again with valid parameters. For other rejection reasons, the UE 200 stops the EAP-5G procedure and restores the IKE SA and EAP stack related resources. For stopping the EAP-5G procedure, a 5G-Stop indication is needed. Both these procedures are described in more detail herein.

Figure 5:
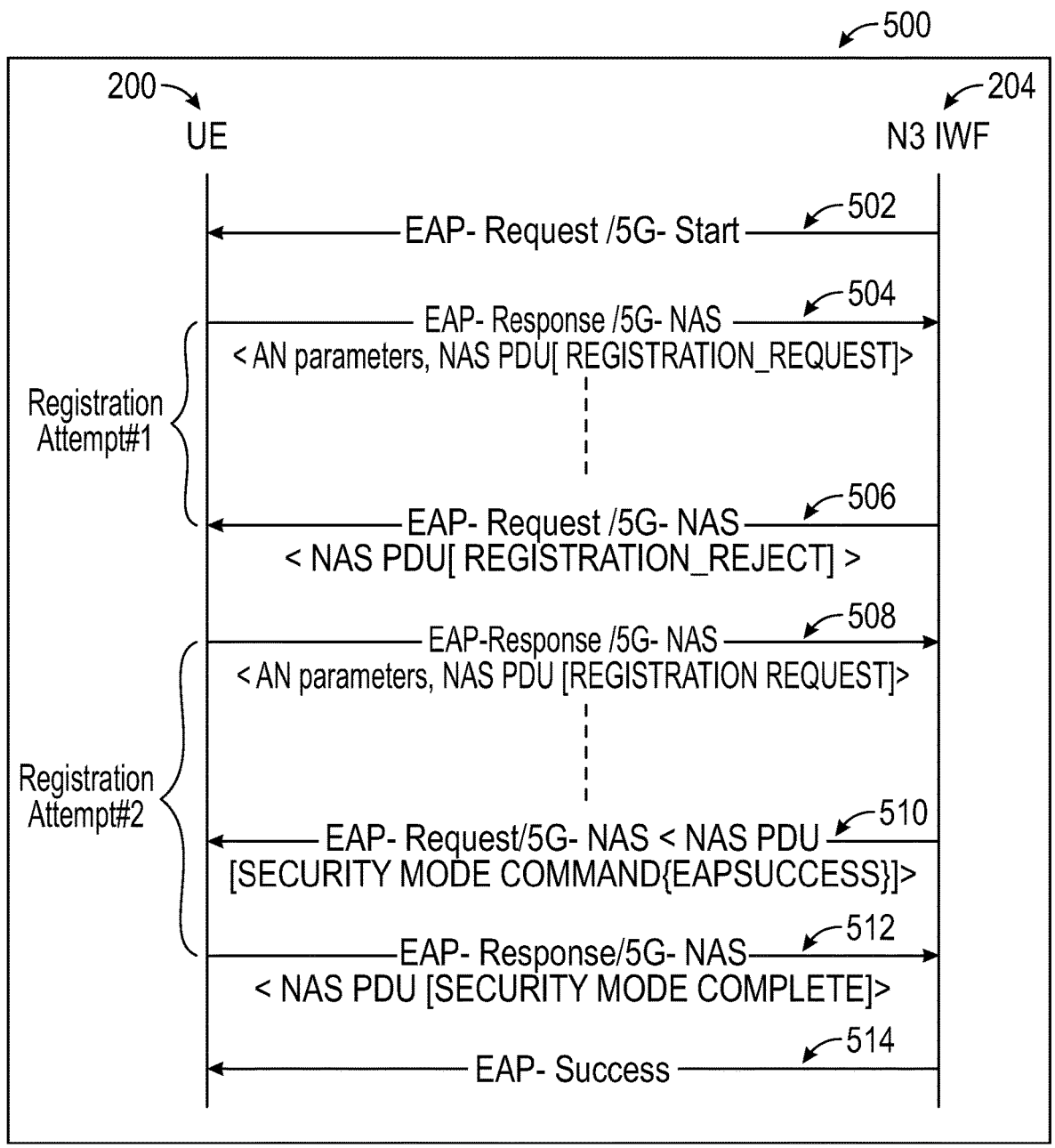
FIG. 5 illustrates a logical flow diagram of an embodiment of a method of an EAP-5G session procedure after authentication failure due to recoverable errors.

Embodiment—EAP-5G Procedure Completion after Registration Failure Due to Recoverable Errors FIG. 5 illustrates a logical flow diagram of an embodiment of a method 500 of an EAP-5G session procedure after authentication failure due to recoverable errors. In this embodiment, the UE 200 registration request to the 5GCN 100 over an untrusted non-3GPP access network 110 is rejected.

The N3IWF 204 transmits an EAP-Request/5G-Start message to the UE 200 in step 502. The 5G start message requests the UE 200 to initiate an EAP-5G session, i.e. to start sending NAS messages encapsulated within EAP-5G packets. The UE 200 generates a registration request to the 5GCN 100 in an EAP-Response/5G-NAS message that includes AN parameters and an NAS-PDU field including the registration request in step 504. In this embodiment, the UE 200 registration to the 5GCN 100 is rejected by the AMF 202. The AMF 202 transmits a REGISTRATION REJECT message to the N3IWF 204. In response, the N3IWF 204 transmits an EAP-Request/5G-NAS message to the UE 200 that includes a NAS-PDU field including a NAS REGISTRATION REJECT message at step 506.

The UE 200 may attempt to initiate registration to the 5GCN again though it is not mandatory to reattempt registration. For recoverable errors, such as syntax errors or certain temporary rejection reasons, the UE 200 may modify the registration request message with updated parameters and re-attempts registration. Alternatively, the UE 200 may reattempt registration later without updating parameters.

The UE 200 transmits a second registration request formatted as an EAP-Response/5G-NAS message that includes the updated AN parameters if needed and an NAS-PDU field including the registration request in step 508. The UE 200 and N3IWF 204 then perform IKE SA and signaling IPsec SA establishment to create an NAS security context and an N3IWF key (not shown).

After the N3IWF key is created in the UE 200, the N3IWF 204 transmits an EAP-Request/5G NAS message including an NAS PDU with a security mode command message indicating EAP-success at 510. The UE 200 requests the completion of the EAP-5G session by generating and transmitting an EAP-Response/5G-NAS message with an NAS PDU including a security mode complete message at 512. This triggers the N3IWF 204 to send an EAP-Success to UE 200, assuming the N3IWF 204 has also received the N3IWF key from AMF 202. This completes the EAP-5G session and no further EAP-5G packets may be exchanged.

The UE 200 may thus reattempt a registration request with the 5GCN 100 through a non-3GPP access network 110 when rejected. The rejection may be due to recoverable errors, such as syntax errors or errors in the AN parameters. The second registration attempt may be successful when such recoverable errors are corrected. In another embodiment, the rejection is due to temporary rejection reasons. The UE 200 may then reattempt registration with the same parameters and complete the EAP-5G session.

Figure 6:
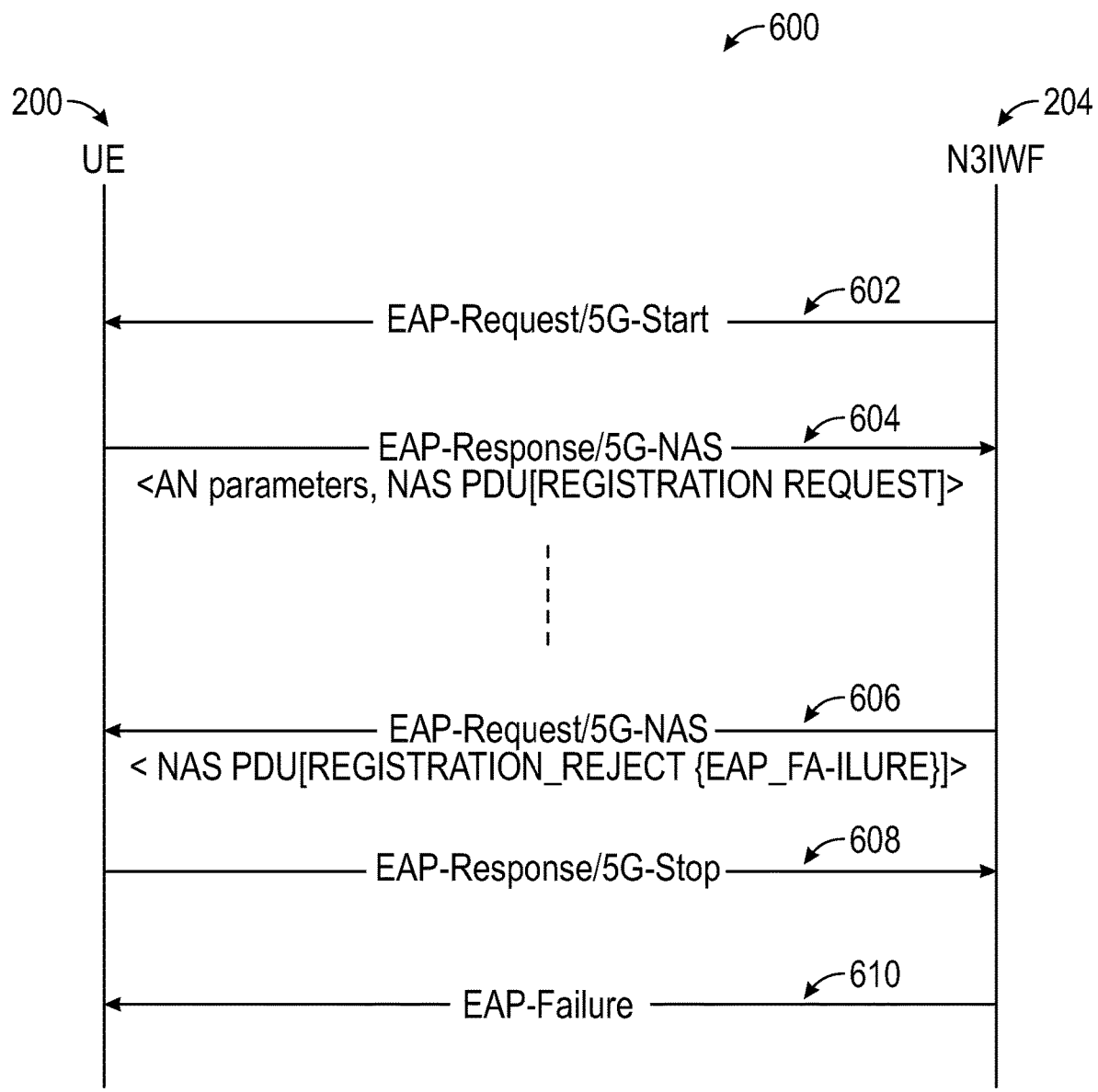
FIG. 6 illustrates a logical flow diagram illustrating an embodiment of an EAP-5G session procedure of a registration rejection due to irrecoverable errors failures.

Embodiment—EAP-5G Procedure Completion after Registration Failure Due to Irrecoverable Errors FIG. 6 illustrates a logical flow diagram illustrating an embodiment of an EAP-5G session procedure of a registration rejection due to irrecoverable errors or permanent failures. In this embodiment, the UE 200 registration request to the 5GCN 100 over an untrusted non-3GPP access network 110 is again rejected.

The N3IWF 204 transmits an EAP-Request/5G-Start message to the UE 200 to initiate registration to the 5GCN 100 over the non-3GPP access network 110 in step 602. The UE 200 responds with a registration request, e.g. an EAP-Response/5G-NAS message that includes AN parameters and an NAS-PDU field including the registration request in step 604.

If authentication fails due to irrecoverable errors, such as the EAP-AKA' authentication was not successful, the N3IWF 204 receives a REGISTRATION REJECT message from the AMF 202 (not shown). In response to receiving the REGISTRATION REJECT message from AMF 202, the N3IWF 204 generates an EAP-Request/5G-NAS message to the UE 200 at 606. The EAP-Request/5G-NAS message includes a NAS-PDU field that includes a NAS REGISTRATION REJECT message with EAP-Failure field.

The UE 200 ends the registration procedure by generating and transmitting an EAP-Response/5G-Stop message at step 608. The 5G-stop message indicates that the EAP session for registration to the 5GCN 100 over the non-3GPP access network 110 is ended. After reception of the EAP-Response/5G-Stop message from the UE 200, the N3IWF 204 completes the EAP-5G procedure by sending an EAP-Failure message to the UE 200 at step 610. In this embodiment, the UE 200 stops the EAP-5G session with no re-attempts at registration.

Figure 7:
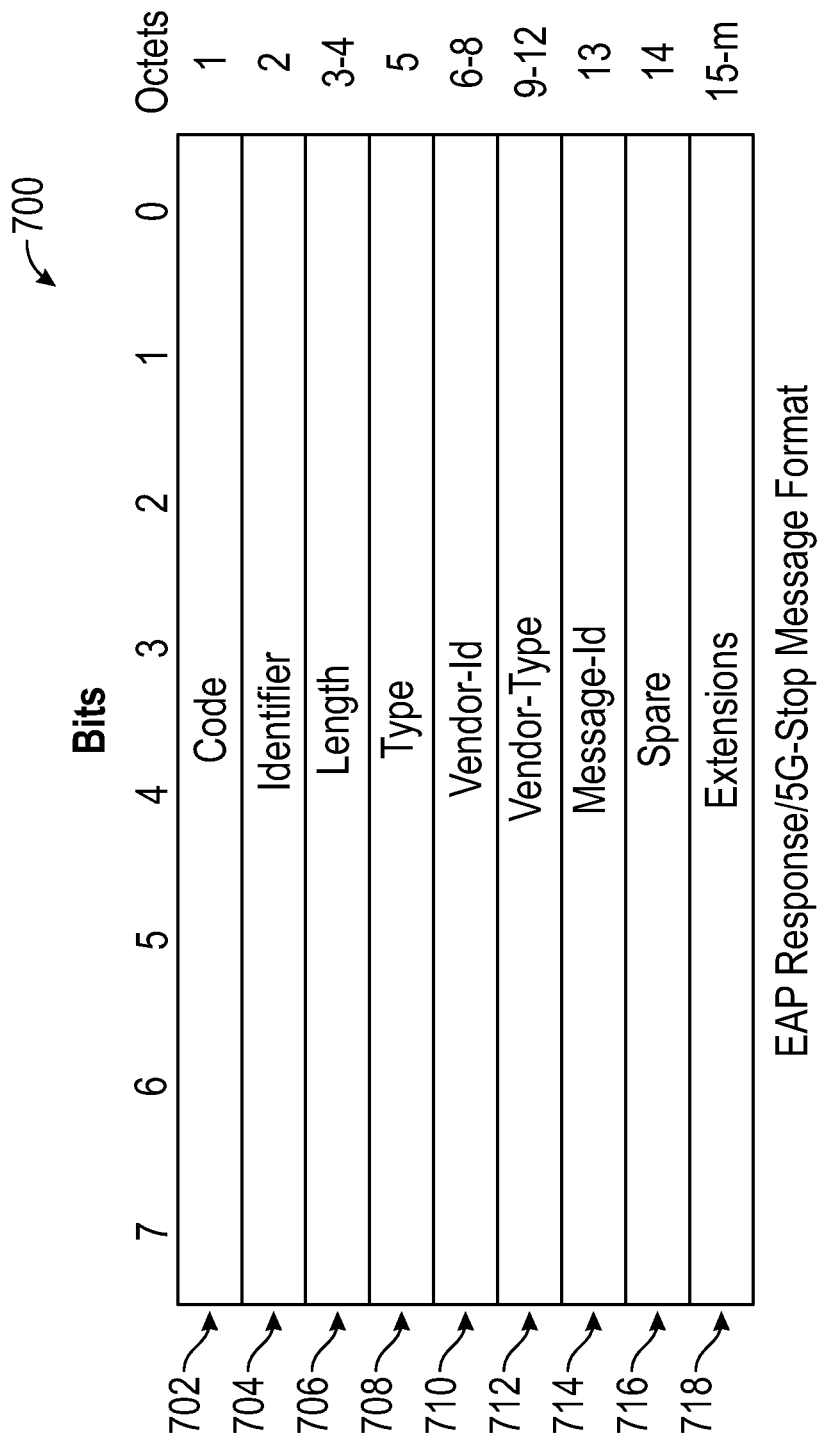
FIG. 7 illustrates a schematic block diagram of an embodiment of an EAP-Response/5G-Stop message.

FIG. 7 illustrates a schematic block diagram of an embodiment of an EAP-Response/5G-Stop message 700. The EAP-Response/5G-Stop message 700 includes various an EAP packet with exemplary fields including code 702, identifier 704, length 706, type 708, vendor-id 710, vendor-type 712, message identifier (Message-Id) 714, spare 716 and extensions 718. The Message-Id field 714 of the EAP packet includes an identifier to indicate a 5G-Stop message. An example of the values for the fields in the EAP packet is described in Table 1 below.

TABLE 1

Code field is set to 1 (decimal) as specified in IETF RFC 3748 [9] subclause 4.1 and indicates request.
Identifier field is set as specified in IETF RFC 3748 [9] subclause 4.1.
Length field is set as specified in IETF RFC 3748 [9] subclause 4.1 and indicates the length of the EAP-Response/5G-Stop message in octets.
Type field is set to 254 (decimal) as specified in IETF RFC 3748 [9] subclause 5.7 and indicates the expanded type.
Vendor-Id field is set to the 3GPP Vendor-Id of 10415 (decimal) registered with IANA under the SMI Private Enterprise Code registry.
Vendor-Type field is set to EAP-5G method identifier of 3 (decimal) as specified in 3GPP TS 33.402 [10] annex C.
Message-Id field is set to 5G-Stop-Id of 4 (decimal).
Spare field consists of spare bits.
Extensions field is an optional field and consists of spare bits.

Example Fields for an EAP-Response/5G-Stop Message

The Message identifier (Message-Id) field 714 in the EAP message includes a 5G Stop identifier or value. The fields and values of the EAP-Response/5G-Stop message 700 are examples and other fields/values or protocol packets may be implemented indicating similar meaning of a registration stop.

Figure 8:
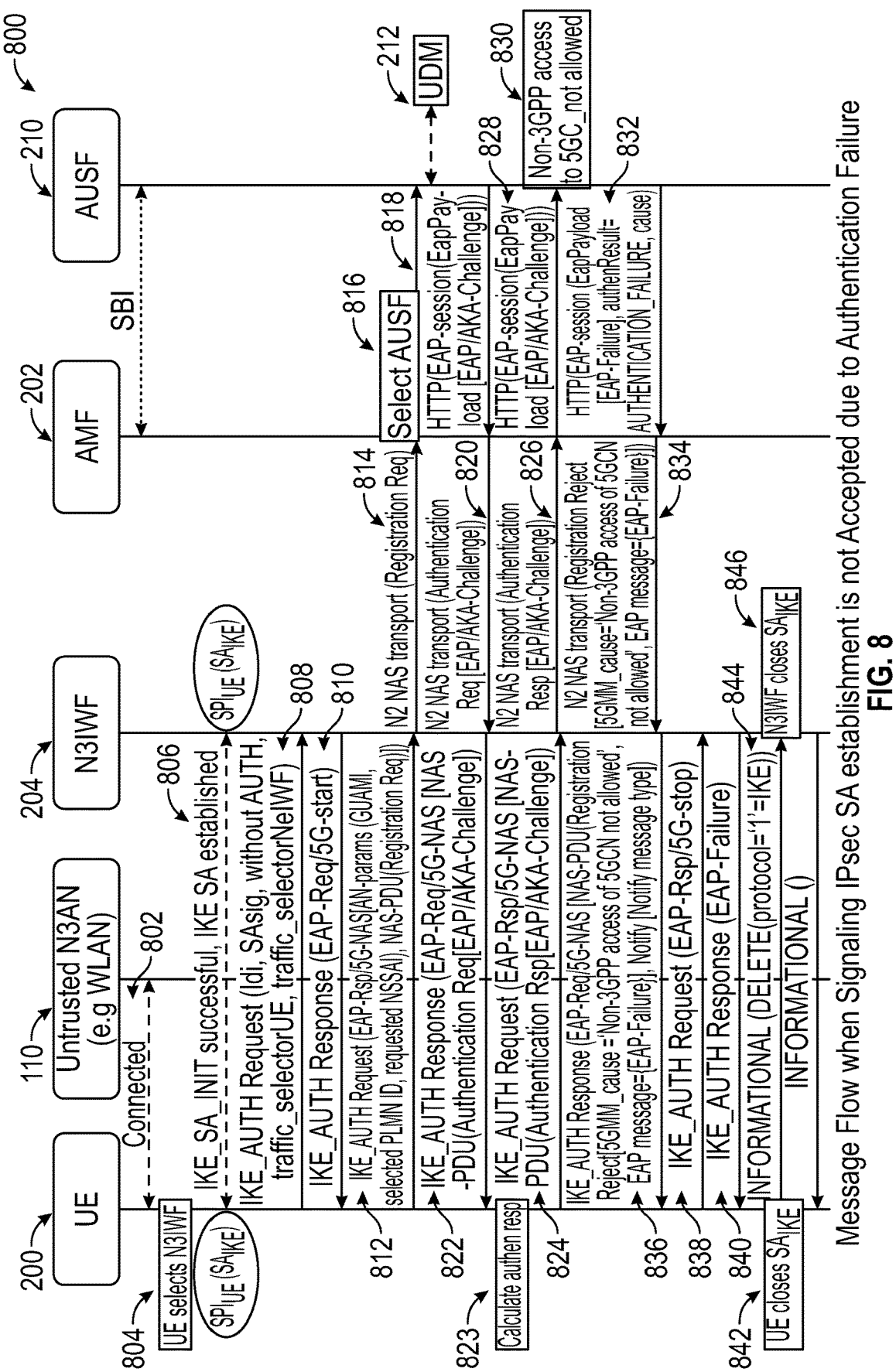
FIG. 8 illustrates a logical flow diagram of an embodiment of a method for message flow among network functions when IKE SA and signaling IPsec SA establishment for UE registration over non-3GPP access is not accepted.

Embodiment—Methods and Protocol Enhancements for Handling when IPsec SA Establishment is not Accepted Due to Authentication Failure FIG. 8 illustrates a logical flow diagram of an embodiment of a method 800 for message flow among network node functions when IKE SA and signaling IPsec SA establishment for UE 200 registration over a non-3GPP access network 110 is not accepted due to authentication failure. For example, the IKE SA and signaling IPsec SA establishment may not be accepted due to an failure of an authentication procedure such as an AKA-Challenge or AKA'-challenge. The method 800 includes a new private IKEv2 Notify message type to signal the failure to the UE 200 and a new cause value to indicate that access to the 5GCN 100 is not allowed by the non-3GPP access network 110.

The UE 200 connects to an untrusted non-3GPP access network (N3AN) 110, e.g. using 802.1x protocols to a public WLAN, in step 802. When the UE 200 decides to attach to the 5GCN 100, the UE 200 selects an N3IWF 204 in a 5G PLMN in step 804. The UE 200 proceeds with the establishment of an IPsec Security Association (SA) with the selected N3IWF 204 by initiating an IKE initial exchange, e.g. as described in IETF RFC 7296 "Internet Key Exchange Protocol Version 2 (IKEv2)," (October 2014), in step 806. After IKE SA establishment, subsequent IKE messages are encrypted, and integrity protected by using the IKE SA established in this step 806.

The UE 200 then initiates an IKE_AUTH exchange by sending an IKE_AUTH request message at step 808. The AUTH payload is not included in the IKE_AUTH request message, which indicates that the IKE_AUTH exchange shall use EAP signaling (in this case EAP-5G signaling). The UE 200 shall set the UE Id field in this message equal to any random number. The N3IWF 204 responds with an IKE_AUTH response message which includes an EAP-Request/5G-Start packet in step 810. The EAP-Request/5G-Start packet informs the UE 200 to initiate an EAP-5G session, i.e. to start sending NAS messages encapsulated within EAP-5G packets.

The UE 200 may also validate the N3IWF certificate and confirm that the N3IWF 204 identity matches the N3IWF 204 selected by the UE 200. An absence of the certificate from the N3IWF 204 or unsuccessful identity confirmation may result in a connection failure. The UE 200 then sends an IKE_AUTH request which includes an EAP-Response/5G-NAS packet to request registration to the 5GCN 100 at step 812. The EAP-Response/5G-NAS message includes AN parameters (e.g., GUAMI, selected PLMN ID, requested NSSAI) and an NAS-PDU field including the registration request The N3IWF 204 then selects an AMF 202 using the AN parameters and forwards the Registration Request received from the UE 200 to the AMF 202 in an N2 NAS transport message in step 814.

The AMF 202 may decide to authenticate the UE 200. In this case, the AMF 202 selects an AUSF 210 at step 816 and sends a key request to the AUSF 210. The AUSF 210 may then initiate an authentication procedure such as an AKA-Challenge or AKA'-challenge at step 818. Between the AMF 202 and UE 200, the authentication packets are encapsulated within NAS authentication messages and the NAS authentication messages are encapsulated within EAP-5G/5G-NAS packets. An EAP-Request/AKA'-Challenge message is transmitted to the UE 200 via the N3IWF 204 in a NAS message Auth-Req message in step 820 and 822. This message may include the ngKSI that will be used by the UE 200 and AMF 202 to identify the partial native security context that is created if the authentication is successful. The UE 200 forwards the RAND and AUTN received in EAP-Request/AKA'-Challenge message to the USIM.

At receipt of the RAND and AUTN, the USIM verifies the authentication vector by checking whether AUTN can be accepted. If so, the USIM computes a response RES at step 823. The UE 200 sends the EAP-Response/AKA'-Challenge message in a NAS message Auth-Resp message in step 824. The EAP-Response/AKA'-Challenge message is transmitted to the AUSF 210 via the AMF 202 in steps 826 and 828. The AUSF 210 will then try to verify the message. If the AUSF 210 has successfully verified this message it shall continue authentication.

In prior known systems, if the AUSF 210 determines non-3GPP access to the 5GCN 100 is not allowed due to authentication failure in step 830, it returns an error. In a new improved system and method, the AMF 202 generates a new private IKEv2 Notify message type to signal that non-3GPP access to the 5GC network is not allowed, e.g. due to the failure of the authentication.

In step 832, the AUSF 210 sends an HTTP EAP session message with an EAP payload of EAP failure and an authentication result of Authentication Failure. The AMF 202 generates a new 5G Mobility Management (5GMM) cause to indicate that Non-3GPP access of 5GCN 100 is not allowed. The AMF 202 generates an N2 NAS transport message with a Registration reject and an EAP message indicating EAP Failure and including the 5GMM cause at step 834. The 5GMM cause indicates an error type, e.g. in this case of "Non-3GPP access of 5GCN not allowed".

The UE 200 receives from the N3IWF 204 an IKE_AUTH response message with a Notify payload with a Private Notify Message Type (e.g. any private notify message type in a predefined range, such as 8192 ... 16383) in step 836. The private IKEv2 Notify message includes an EAP response/5G-NAS PDU including the registration rejection with the 5GMM cause of "NON_3GPP_ACCESS_TO_5GCN_NOT_ALLOWED" and an EAP message type of EAP-Failure.

The method 800 thus includes a new Private IKEv2 Notify Message Type and new 5GMM cause value to inform the UE of the failure of the registration request that non-3GPP access to the 5GCN 100 is not allowed. Though a new private IKEv2 Notify message is implemented, other types of messages or formats or fields or error types may be implemented to inform the UE 200 that non-3GPP access to the 5GC network is not allowed or has been rejected.

Upon receiving the Private Notify Message with 5GMM cause of NON_3GPP_ACCESS_TO_5GCN_NOT_ALLOWED, the UE 200 ends the EAP-5G session by sending an EAP-Response/5G-Stop message in step 838. The UE 200 receives from the N3IWF 204 an IKE_AUTH response message with an EAP Failure message in step 840.

On reception of the EAP-Failure message from the N3IWF 204, the UE 200 performs IKEv2 SA deletion procedure and closes the IKE SA in step 842. The UE 200 does not re-initiate the IKE SA and IPsec SA establishment to the N3IWF 204 from the same PLMN until switching off or the UICC containing the USIM is removed. The UE 200 may transmit an informational message of the IKEv2 SA deletion at step 844. The N3IWF 204 may then close the IKEv2 SA at step 846.

Figure 9:
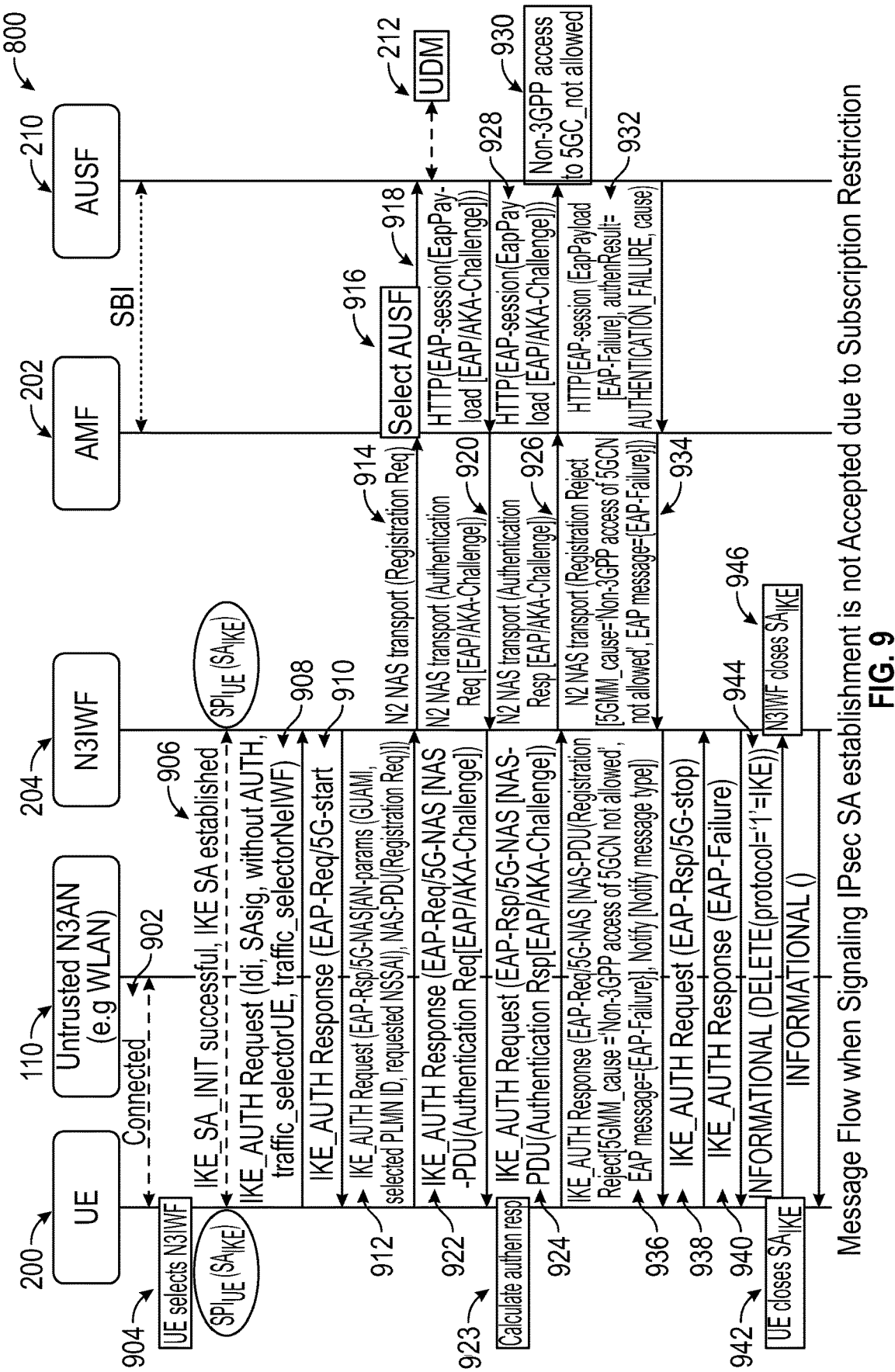
FIG. 9 illustrates a logical flow diagram of an embodiment of a method for message flow among network functions when IKE SA and signaling IPsec SA establishment for UE registration over non-3GPP access is not accepted due to subscription restriction.

Embodiment—Methods and Protocol Enhancements for Handling when IPsec SA Establishment is not Accepted Due to Subscription Restriction FIG. 9 illustrates a logical flow diagram of an embodiment of a method 900 for message flow among network functions when IKE SA and signaling IPsec SA establishment for UE 200 registration over non-3GPP access is not accepted due to subscription restriction. For example, the IKE SA and signaling IPsec SA establishment may not be accepted due to a subscription restriction. The method 900 includes a new private IKEv2 Notify message type to signal the failure to the UE 200 and a new cause value to indicate that access to the 5GCN 100 is not allowed by the non-3GPP access network 110.

The UE 200 connects to an untrusted non-3GPP access network (N3AN) 110, e.g. using 802.1x protocols to a public WLAN, in step 902. When the UE 200 decides to attach to the 5GCN 100, the UE 200 selects an N3IWF 204 in a 5G PLMN in step 904. The UE 200 proceeds with the establishment of an IPsec Security Association (SA) with the selected N3IWF 204 by initiating an IKE initial exchange, e.g. as described in IETF RFC 7296 "Internet Key Exchange Protocol Version 2 (IKEv2)," (October 2014), in step 906. After IKE SA establishment, subsequent IKE messages are encrypted, and integrity protected using the established keys in the IKE SA.

The UE 200 then initiates an IKE_AUTH exchange by sending an IKE_AUTH request message at step 908. The AUTH payload is not included in the IKE_AUTH request message, which indicates that the IKE_AUTH exchange shall use EAP signaling (in this case EAP-5G signaling). The UE 200 sets the UE Id field in this message equal to any random number. The N3IWF 204 responds with an IKE_AUTH response message which includes an EAP-Request/5G-Start packet in step 910. The EAP-Request/5G-Start packet informs the UE 200 to initiate an EAP-5G session, i.e. to start sending NAS messages encapsulated within EAP-5G packets.

The UE 200 may also validate the N3IWF certificate and confirm that the N3IWF 204 identity matches the N3IWF 204 selected by the UE. An absence of the certificate from the N3IWF 204 or unsuccessful identity confirmation may result in a connection failure. The UE 200 then sends a registration request in an IKE_AUTH request which includes an EAP-Response/5G-NAS packet in step 912. The EAP-Response/5G-NAS packet includes AN parameters, such as GUAMI, selected PLMN ID, requested NSSAI, and an NAS PDU with the registration request. The N3IWF 204 then selects an AMF 202 and forwards the Registration Request in the NAS PDU received from the UE 200 to the AMF 202 in step 914.

The AMF 202 may decide to authenticate the UE 200. In this case, the AMF 202 selects an AUSF 210 at step 916 and sends a key request to the AUSF 210. The AUSF 210 may then initiate an authentication procedure such as an AKA-Challenge or AKA'-challenge at step 918. Between the AMF 202 and UE 200, the authentication packets are encapsulated within NAS authentication messages and the NAS authentication messages are encapsulated within EAP-5G/5G-NAS packets. An EAP-Request/AKA'-Challenge message is transmitted to the UE 200 in a NAS message Auth-Req message by the AMF in step 920 and forwarded by the N3IWF in step 922. This message may include the ngKSI that will be used by the UE 200 and AMF 202 to identify the partial native security context that is created if the authentication is successful. The UE 200 forwards the RAND and AUTN received in EAP-Request/AKA'-Challenge message to its USIM.

At receipt of the RAND and AUTN, the USIM verifies the authentication vector by checking whether AUTN can be accepted. If so, the USIM calculates an authentication response at step 923. The UE 200 sends the EAP-Response/AKA'-Challenge message in a NAS message Auth-Resp message in step 924. The EAP-Response/AKA'-Challenge message is transmitted by the N3IWF to the AMF in step 926 and then to the AUSF 210 in step 928. The AUSF 210 will then try to verify the message. If the AUSF 210 has successfully verified this message it shall continue authentication. However, the AUSF 210 may reject the authentication and not allow the non-3GPP access to the 5GCN 100 in step 930.

In prior known systems, if the AUSF 210 determines authentication failure, then the AUSF 210 returns an error. In a new improved method, the AMF 202 generates a new cause to signal that non-3GPP access to the 5GCN 100 is not allowed. For example, the AMF 202 may generate a new private IKEv2 Notify message type to signal the UE 200 that non-3GPP access to the 5GCN 100 is not allowed, e.g. due to a subscription or network restriction.

In step 932, the AUSF 210 sends an HTTP EAP session message with an EAP payload of EAP failure and authentication result of Authentication Failure with a cause. The AMF 202 generates an N2 NAS transport message with a Registration reject and an EAP message of EAP Failure that includes a 5GMM cause at step 934. The 5GMM cause indicates an error type of NON_3GPP_ACCESS_TO_5GCN_NOT_ALLOWED.

The N3IWF 204 receives the response from the AMF 202 encapsulating a Registration Reject message including a 5GMM cause value indicating Non-3GPP access to 5GCN not allowed and an EAP-Failure type message. The N3IWF 204 generates an IKE_AUTH response message with a Notify payload with a Private Notify Message Type (e.g. any private notify message type in a predefined range, such as 8192 . . . 16383) in step 936. The private IKEv2 Notify message includes an EAP response/5G-NAS PDU including the registration rejection with the 5GMM cause of "NON_3GPP_ACCESS_TO_5GCN_NOT_ALLOWED" and an EAP message type of EAP-Failure.

A new 5GMM cause code is thus implemented to signal to the UE 200 that non-3GPP access to the 5GCN 100 is not allowed. This 5GMM cause is generated by the AMF 202 and transmitted to the UE 200 if it requests services over non-3GPP access in a PLMN, where the UE 200 by subscription or network restriction, is not allowed to access the 5GCN 100 over a non-3GPP access network 110. The UE 200 is thus informed of the rejection to access the 5GCN 100 over the non-3GPP access network 110.

The UE 200 receives from the N3IWF 204 the IKE_AUTH response message with a Notify payload with a Private Notify Message Type and EAP message of EAP-Failure and the 5GMM cause of NON_3GPP_ACCESS_TO_5GCN_NOT_ALLOWED in step 936. The UE 200 rather than just receiving an error message thus receives a registration rejection notification with a reason.

The UE 200 then ends the registration request by generating an EAP-Response/5G-Stop message to the N3IWF 204 in step 938. The UE 200 receives from the N3IWF 204 an IKE_AUTH response message with an EAP Failure message in step 940.

On reception of the EAP-Failure message from the N3IWF 204, the UE 200 performs IKEv2 SA deletion procedure and closes the IKE SA in step 942. In this example, due to the unrecoverable error of a subscription or network restriction, the UE 200 does not re-initiate the IKE SA and IPsec SA establishment to a N3IWF 204 from the same PLMN until switching off or the UICC containing the USIM is removed. The UE 200 may transmit an informational message of the IKEv2 SA deletion at step 944. The N3IWF 204 may then close the IKEv2 SA at step 946.

Figure 10:
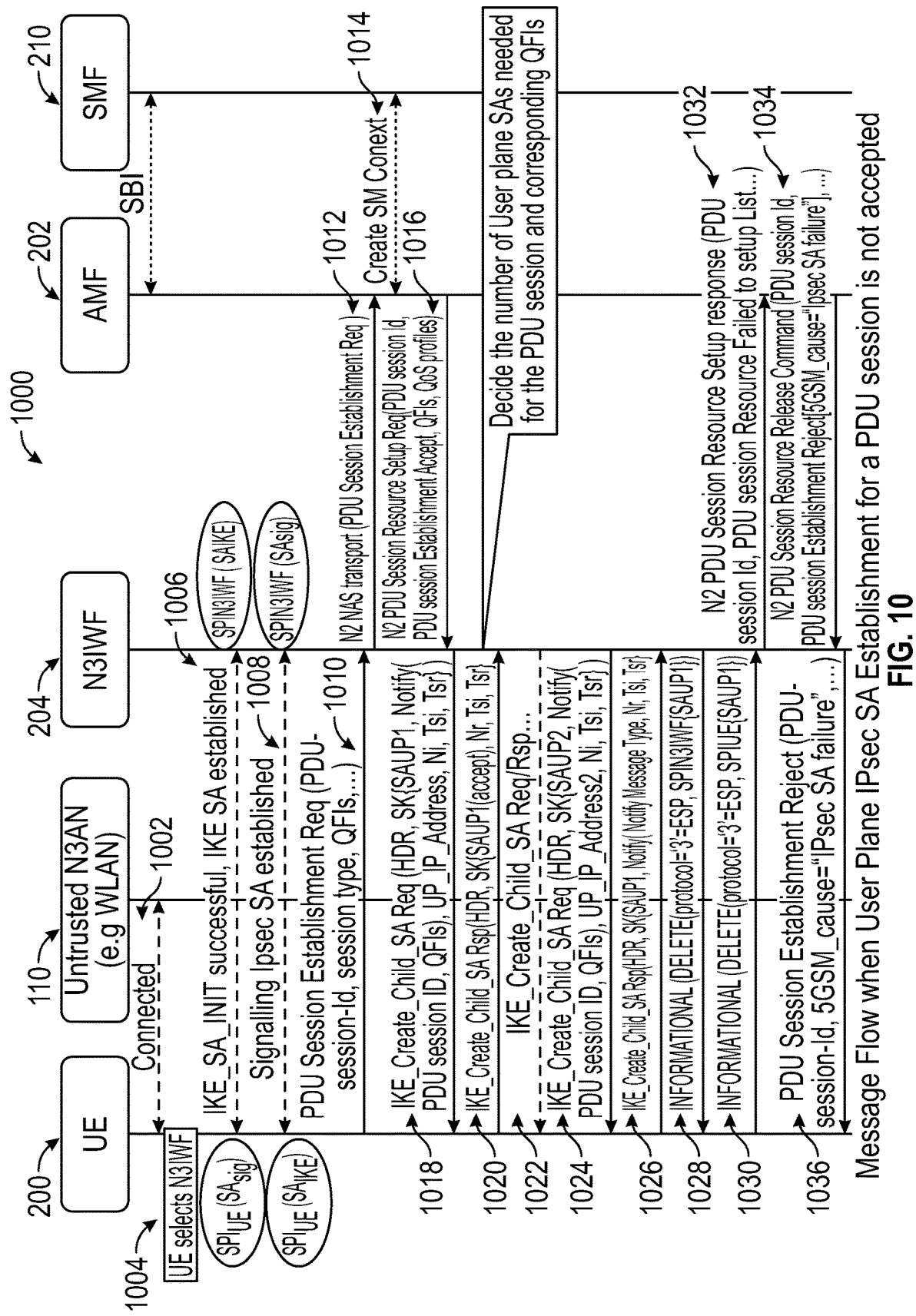
FIG. 10 illustrates a logical flow diagram of an embodiment of a method for message flow among network functions when the user plane IPsec security association establishment is not accepted.

Embodiment—Methods and Protocol Enhancements for Handling when a User Plane IPsec SA Establishment is Not Accepted FIG. 10 illustrates a logical flow diagram of an embodiment of a method for message flow among network node functions when the user plane IPsec security association (SA) establishment is not accepted. The UE 200 connects to an untrusted non-3GPP access network (N3AN) 110, e.g. using 802.1x protocols to a public WLAN, in step 1002. When the UE 200 decides to attach to the 5GCN 100, the UE 200 selects an N3IWF 204 in a 5G PLMN in step 1004. The UE 200 proceeds with the establishment of an IPsec Security Association (SA) with the selected N3IWF 204 by initiating an IKE initial exchange in step 1006. In this embodiment, the UE 200 successfully establishes an IKE SA and signaling IPsec SA to the selected N3IWF 204 at 1008. For example, the authentication of the UE 200, e.g. such as an EAP-AKA' procedure is successful, and the EAP-5G is complete, as shown in FIG. 3.

The UE 200 then transmits a PDU Session Establishment Request message to the AMF 202 to establish a user plane IPsec SA at 1010. This PDU Session Establishment Request message is sent to the N3IWF 204 via the signaling IPsec SA and the N3IWF 204 transparently forwards it to AMF 202 in the 5GCN 100 at step 1012. The AMF 202 may create a session management (SM) Context with the SMF 206 at step 1014. The AMF 202 sends a NAS N2 interface PDU Session Request message to N3IWF 204 to establish the access resources for this PDU Session, e.g. in a N2 PDU Session Resource Setup request, in step 1016. The PDU session request may include a PDU session Id, PDU session Establishment Accept, QFIs, QoS profiles, etc.

Based on its own policies and configuration and based on the QoS profiles received in the N2 PDU Session Request, the N3IWF 204 determines a number of user plane IPsec SAs to establish and the QoS profiles associated with each user plane IPsec SA. For example, the N3IWF 204 may decide to establish one user plane IPsec SA and associate all QoS profiles with this user plane IPsec SA. In this example, all QoS Flows of the PDU Session would be transferred over one user plane IPsec SA. In another example, the N3IWF 204 may decide to establish a plurality of user plane IPsec child SAs and associate certain QoS profiles with different ones of the plurality of user plane IPsec child SAs.

The N3IWF 204 sends to the UE 200 an IKE Create_Child_SA request to establish the first user plane IPsec child SA for the PDU Session at step 1018. The IKE Create_Child_SA request indicates a first user plane IPsec child SA with identification of SAup1. This request may include a 3GPP-specific Notify payload which includes (a) the QFI(s) associated with the child SA, (b) the identity of the PDU Session associated with this child SA, (c) optionally, a DSCP value associated with the child SA and (d) an UP_IP_ADDRESS. The IKE Create_Child_SA request may also include other information, such as the SA payload, the Traffic Selectors (TS) for the N3IWF 204 and the UE 200, etc.

When the UE 200 accepts the new IPsec child SA, the UE 200 sends an IKE Create_Child_SA response at step 1020. The UE 200 and the N3IWF 204 may exchange multiple iterations of IKE Create_Child_SA requests and responses to establish a plurality of IPsec child SAs at step 1022. The additional IPsec child SAs are established, each one associated with one or more QFI(s) and with a UP_IP_ADDRESS.

If user plane IPsec SA request in step 1024 is not accepted by the UE 200 as in step 1026, the UE 200 sends a CREATE_CHILD_SA response message to the N3IWF 204 with a Notify payload of error type at step 1026. The notify message type may be "error". The notify message type of "error" indicates that the IPsec child SA is not accepted by the UE 200.

Upon receiving the CREATE_CHILD_SA response message with a Notify payload of error type, the N3IWF 204 indicates the failure and PDU session Resource Failed to setup list to AMF 202 via N2 PDU Session Resource Setup response message at step 1032 to trigger rejection of the PDU session establishment over non-3GPP access. Alternatively, if the N3IWF 204 previously decided to create multiple user plane IPsec SAs for the QoS flow identifiers (QFIs) of the PDU session, and one or more user plane IPsec SAs of the PDU session are already active, the network can choose to complete the PDU session establishment by mapping the QFI(s) of the failed user plane IPsec SAs to the user plane IPsec SAs already established, as seen in steps 1028 and 1030.

Upon receiving N2 PDU Session Resource Release command including a NAS PDU indicating PDU Session Establishment Reject message in step 1034, the N3IWF 204 transparently forwards the PDU Session Establishment Reject to the UE 200 in step 1036. A dedicated 5G Session Management (5GSM) cause "IPsec SA failure" is established to indicate the PDU session rejection reason.

Embodiment—Private IKEv2 Notify Message Types for Non-3GPP Access

Table 2 below lists notify message types for non-3GPP access. In this example, private IKEv2 notify messages and private error types are described, however other message protocols, values and error types may be used to provide notification to a UE 200 of the reasons or errors when non-3GPP access to a 5GCN 100 is not allowed.

In this example, private IKEv2 notify message types are defined for non-3GPP access usage. The Notify Message Type with a value (in decimal) between 8192 and 16383 is reserved for private error usage though other values and fields may be implemented. The Notify Message Type with a value (in decimal) between 40960 and 65535 is reserved for private status usage. Only the private IKEv2 Notify Message Types used for this specification are described herein. The Private Notify Message Error Types defined in Table 2 are error notifications which indicate an error while negotiating non-3GPP access to a 5GCN 100. For example, the error types may be generated in response to negotiating an IKEv2 SA or IPsec SA for non-3GPP access to a 5GCN 100. The fields and values of the private notify message types are examples and other fields/values may be implemented indicating similar meanings.

UE 200 is rejected by the network. In this embodiment, a new cause code corresponds to "Non-3GPP access to 5GCN not allowed". This 5GMM cause is sent to the UE 200 if it requests services over non-3GPP access in a PLMN, where the UE 200 by subscription or network restriction or other authentication failure, is not allowed to access the 5GCN 100 over non-3GPP access.

Figure 12:
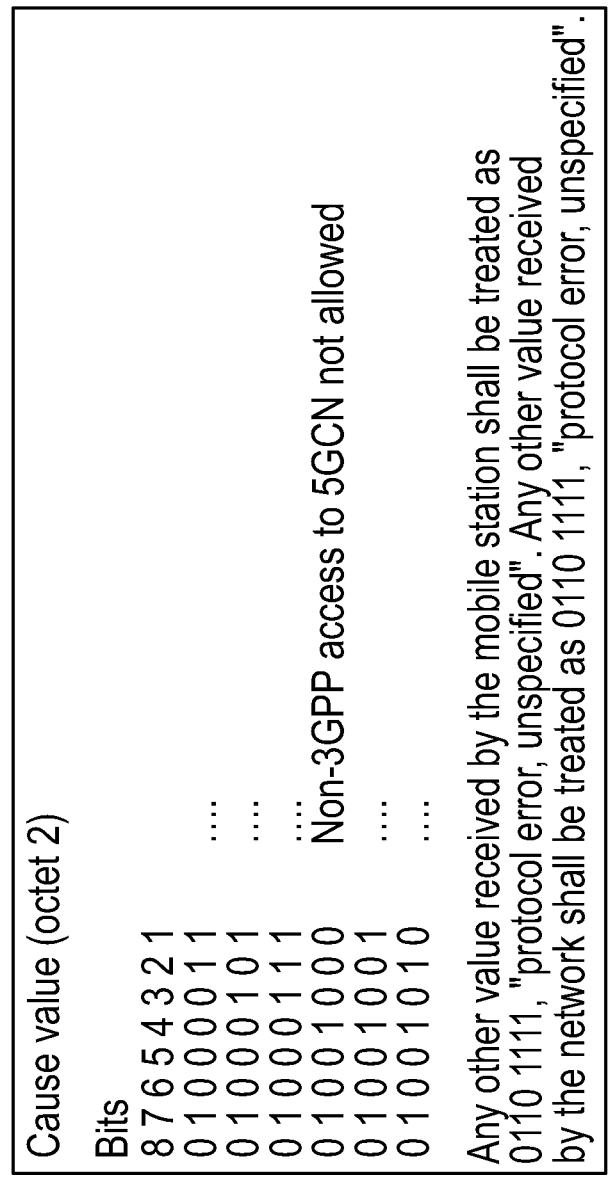
FIG. 12 illustrates a schematic block diagram of an embodiment of values for the 5GMM Cause Information Element.

FIG. 12 illustrates a schematic block diagram of an embodiment of values for the 5GMM Cause Information Element. In this example, a predetermined value corresponds to "Non-3GPP access to 5GCN not allowed." Other values received by the UE 200 are treated as "protocol error, unspecified". Any other value received by the network are also treated as "protocol error, unspecified". The fields and values of the 5GMM Cause Information Element are examples and other fields/values may be implemented indicating similar meanings.

Figure 13:
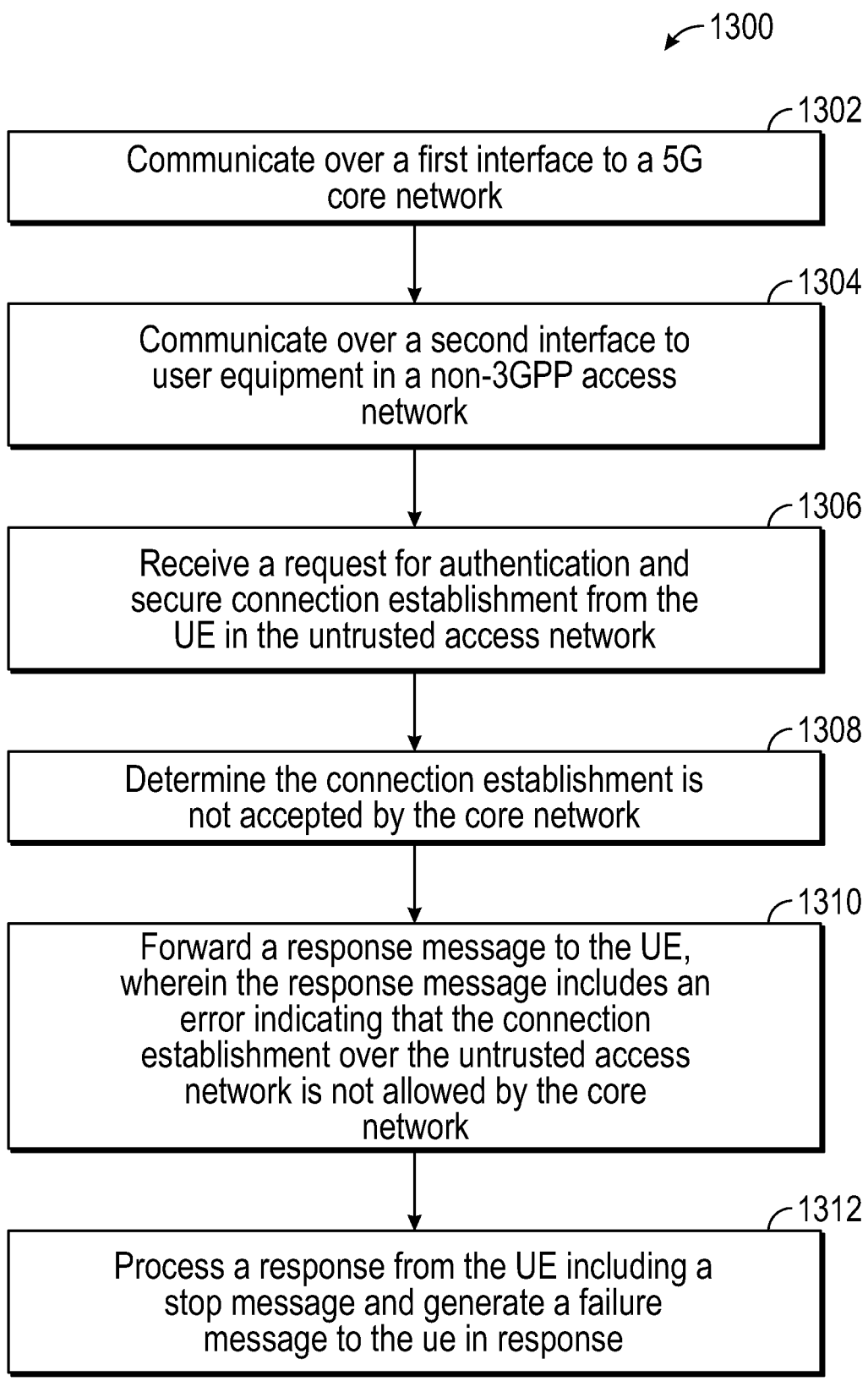
FIG. 13 illustrates a logical flow diagram of an embodiment of a method of the N3IWF.

FIG. 13 illustrates a logical flow diagram of an embodiment of a method 1300 of the N3IWF 204. The N3IWF 204 communicates using a first interface with nodes in the 5GCN

TABLE 2

| Notify Message | Value (in decimal) | Descriptions |
| --- | --- | --- |
| AUTHORIZATION_REJECTED | 9003 | The error type is used to indicate that the requested service was rejected because the UE is not authorized to use this service. |
| ILLEGAL_ME | 9006 | The error type is used to indicate that the requested service was rejected either due to authentication failure or because an identity of the UE is not acceptable to the network |
| RAT_TYPE_NOT_ALLOWED | 11001 | The error type is used to indicate that the requested service was rejected the RAT type used is not allowed by the PLMN. |
| PEI_NOT_ACCEPTED | 11005 | The error type is used to indicate that the emergency PDU session request was rejected since the network does not accept an emergency service request using a PEI. |
| PLMN_NOT_ALLOWED | 11011 | The error type is used to indicate that the requested service was rejected due to subscription or due to operator determined barring |
| NETWORK_FAILURE | 10500 | The error type is used to indicate that the requested service was rejected due to network failures. |
| CONGESTION | 12005 | The error type is used to indicate that the requested service was rejected due to network congestion |
| 5GS_SERVICEs_NOT_ALLOWED | 12007 | The error type is used to indicate that the requested service was rejected because 5GS services are not allowed. |
| NON_3GPP_ACCESS_TO_5GC_NOT_ALLOWED | 12071 | The error type is used to indicate that the requested service was rejected becausethe UE is not allowed to use non-3GPP access to 5GC. |

Notify Message Types for Non-3GPP Access

The UE 200 may receive a message with an error type indicating that Non-3GPP access to the 5GCN 100 is not allowed. The UE 200 is thus informed of the rejection to access the 5GCN 100 over the non-3GPP access network 110.

Figure 11:
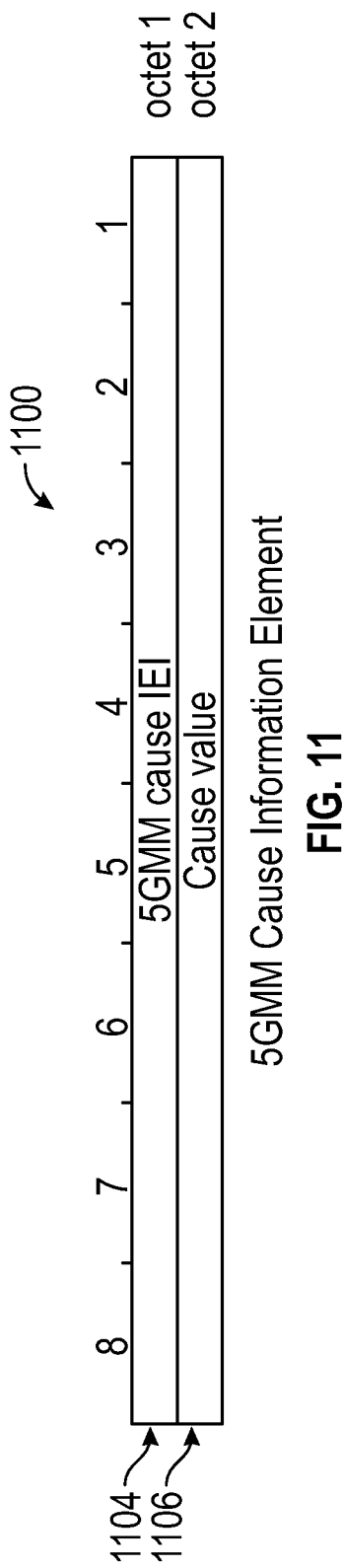
FIG. 11 illustrates a schematic block diagram of an embodiment of a 5GMM Cause Information Element 1100.

Embodiment—Cause Code to Signal Authentication Failure Due to No Subscription for Non-3GPP Access to 5GC Network FIG. 11 illustrates a schematic block diagram of an embodiment of a 5GMM Cause Information Element 1100. The 5GMM cause Information Element 1100 includes a 5GMM cause information element indicator (IEI) 1104 and a cause value 1106. The cause value 1106 indicates a reason that a 5GMM request for access to the 5GCN 100 from the

100 using one or more protocols at step 1302. The N3IWF 204 communicates with a UE over a non-3GPP access network using at least a second interface, such as a WLAN transceiver compliant with IEEE 802.1x WLAN protocols, at step 1304.

The N3IWF 204 processes a registration request for a secure connection establishment to the core network from the UE 200 in the untrusted access network at step 1306. For example, the N3IWF 204 receives an EAP-Response/5G-NAS message that includes AN parameters and a registration request from the UE 200. The N3IWF 204 forwards the message to the 5GCN 100 for authentication and subscription check of the UE 200. For example, the N3IWF 204 generates a request for authentication and subscription check and transmits the request for authentication and subscription check over the second interface towards the AMF 202.

The N3IWF 204 determines the connection establishment is not accepted by the core network at step 1308, e.g. due to irrecoverable errors. For example, the AMF 202 receives an authentication failure response from the AUSF 210. The AMF 202 generates a NAS transport message with a Registration reject and an EAP message of EAP Failure that includes a 5GMM cause. The 5GMM cause indicates an error type of NON_3GPP_ACCESS_TO_5GCN_NOT_ALLOWED. The N3IWF 204 receives the response from the AMF 202 encapsulating the Registration Reject message including the 5GMM cause value indicating Non-3GPP access to 5GCN not allowed.

The N3IWF 204 generates a response message to the UE, wherein the response message includes the cause value indicating that the connection establishment over the untrusted network access is not allowed by the core network at step 1310. For example, the N3IWF 204 generates an Internet Key Exchange (IKE) response message with the payload including a message type or EAP-Failure indicating that the connection establishment is not accepted by the 5GCN 100 and the 5GMM cause. The EAP-Response/5G-NAS message to the UE 200 includes a registration reject message with an EAP-Failure field and 5GMM cause. The 5GMM cause in the registration reject message indicates that non-3GPP access is not allowed by the 5GCN 100.

In an embodiment, the IKE response message to the UE may include IKE_AUTH response message with a Notify payload with a Private Notify Message Type (e.g. any private notify message type in a predefined range, such as 8192 . . . 16383). The private IKEv2 Notify message includes an EAP response/5G-NAS PDU including the registration rejection with the 5GMM cause of "NON_3GPP_ACCESS_TO_5GCN_NOT_ALLOWED" and an EAP message type of EAP-Failure.

The N3IWF 204 processes a response from the UE 200 including a stop message and generates a failure message to the UE 200 in response. For example, the UE 200 transmits an EAP-Response/5G-Stop message to the N3IWF 204 to indicate an end of the registration request for a secure session establishment with the 5GCN 100. The EAP-response packet includes a message type identifier of 5G stop. After reception of the EAP-Response/5G-Stop message from the UE 200, the N3IWF 204 completes the EAP-5G procedure by sending an EAP-Failure message to the UE 200. Though the N3IWF 204 is described as performing these steps in method 1300, other nodes or modules in communication with the UE and the core network may perform one or more of the steps described herein.

Figure 14:
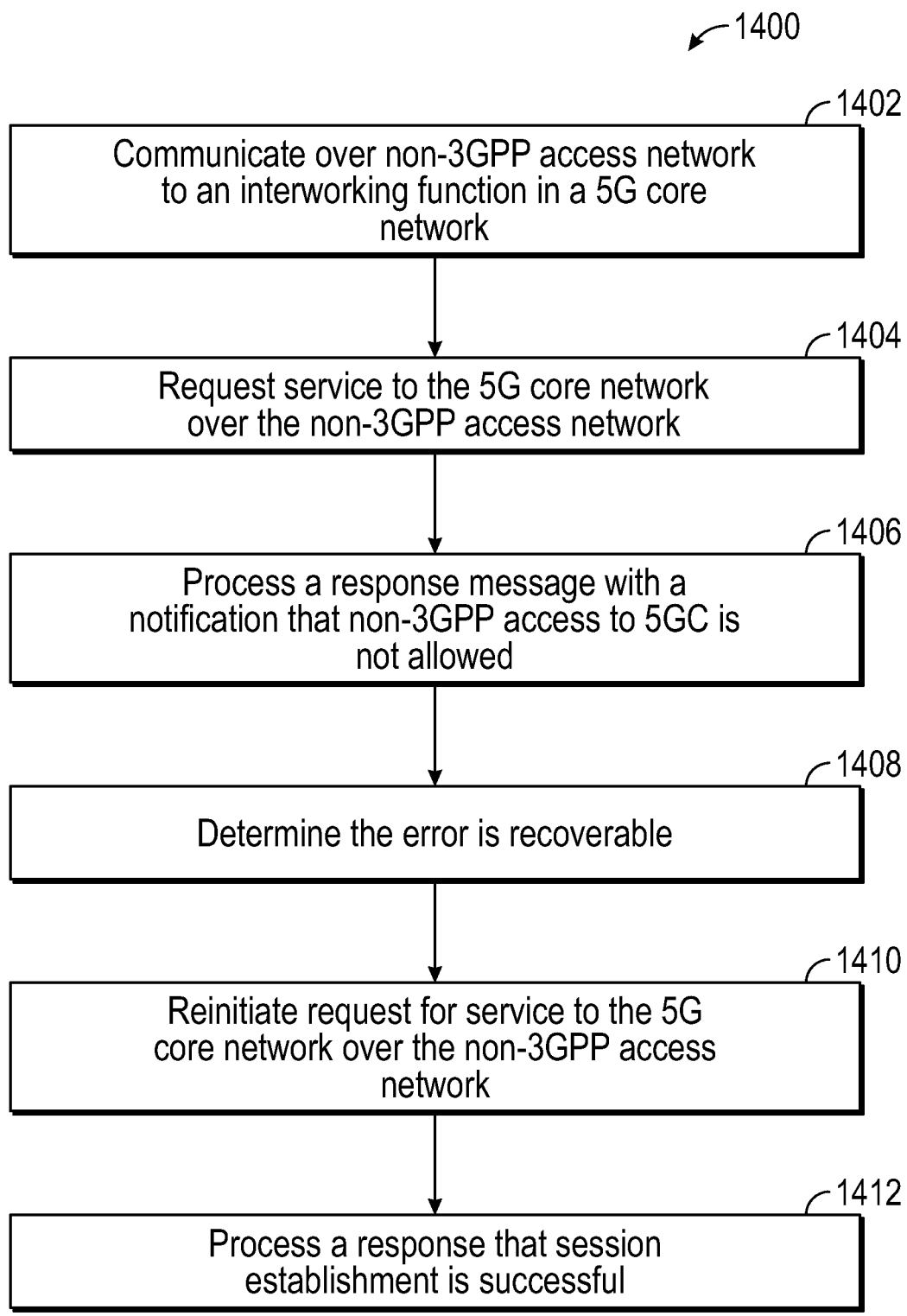
FIG. 14 illustrates a logical flow diagram of an embodiment of a method of a registration request to a core network over an untrusted access network with authentication failure due to recoverable errors.

FIG. 14 illustrates a logical flow diagram of an embodiment of a method 1400 of a registration request to a core network over an untrusted access network with authentication failure due to recoverable errors. The UE 200 is configured to communicate over a Non-3GPP access network to an interworking function (such as N3IWF 204) in a 5GCN 100 at step 1402. The UE 200 may request registration to the 5GCN 100 over the Non-3GPP access network at 1404. The UE 200 processes a response message with a notification that Non-3GPP access to the 5GCN 100 is not allowed at 1406. The UE 200 determines that the error or reason for the rejection is recoverable at step 1408. The UE 200 may correct parameters in this second registration request from the first attempt. Alternatively, the UE may decide to reattempt registration later with the same parameters. The UE 200 then transmits the second registration request to the 5GCN 100 over the Non-3GPP access network at 1410. The UE 200 then processes a response that session establishment is successful at step 1412.

Figure 15:
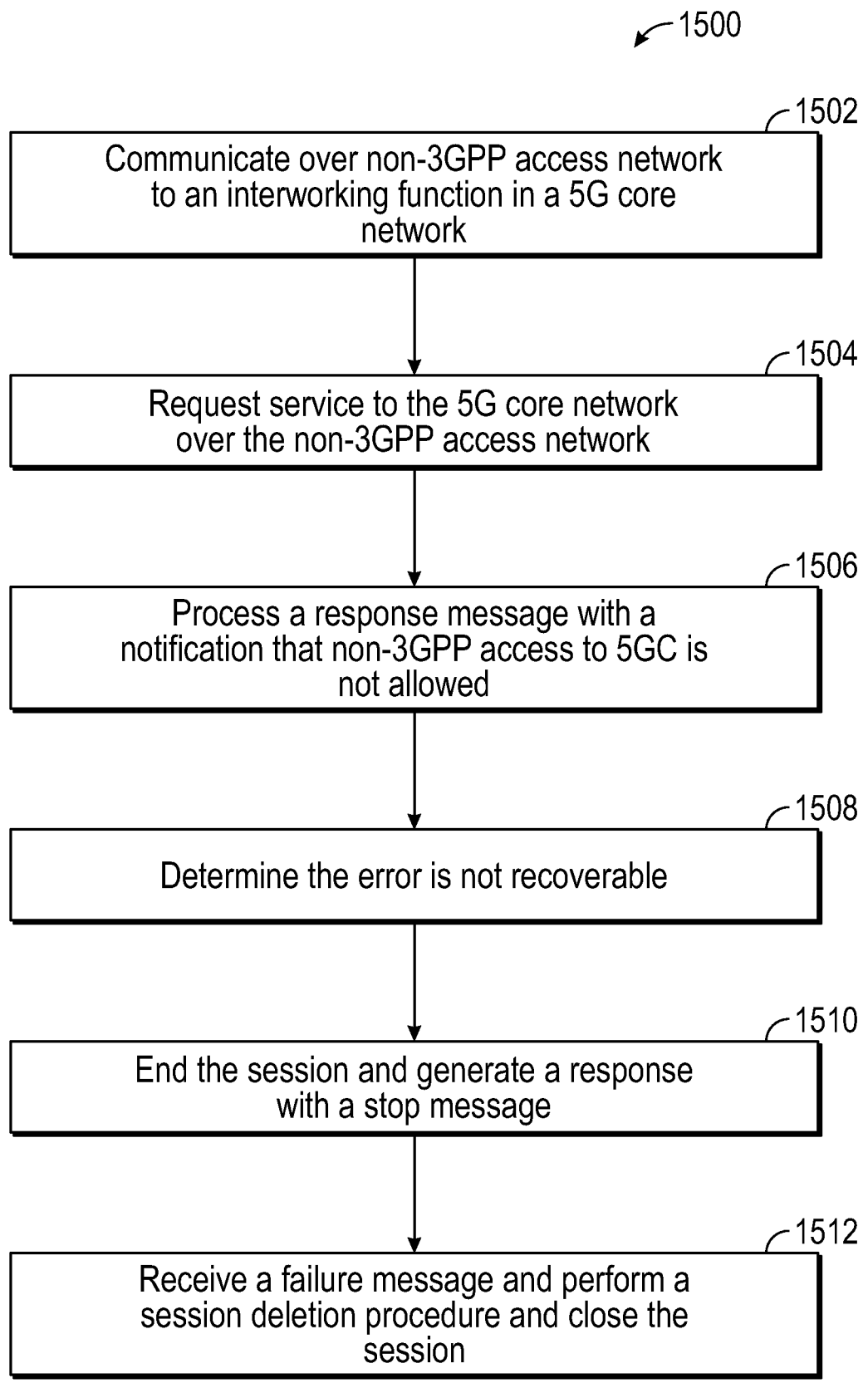
FIG. 15 illustrates a logical flow diagram of an embodiment of a method of a registration request to a core network over an untrusted access network with authentication failure due to irrecoverable errors.

FIG. 15 illustrates a logical flow diagram of an embodiment of a method 1500 of a registration request to a core network over an untrusted access network with authentication failure due to irrecoverable errors. The UE 200 is configured to communicate over a Non-3GPP access network to an interworking function (such as N3IWF 204) in a 5GCN 100 at step 1502. The UE 200 may request registration to the 5GCN 100 over the Non-3GPP access network at 1504. The UE 200 processes a response message with a notification that Non-3GPP access to the 5GCN 100 is not allowed at 1506. The UE 200 determines that the error or reason for the rejection is not recoverable at step 1508. The UE 200 ends the session and generates a response with a stop message at step 1510. The UE 200 receives a failure message and performs a deletion procedure and closes the session at step 1512.

Figure 16:
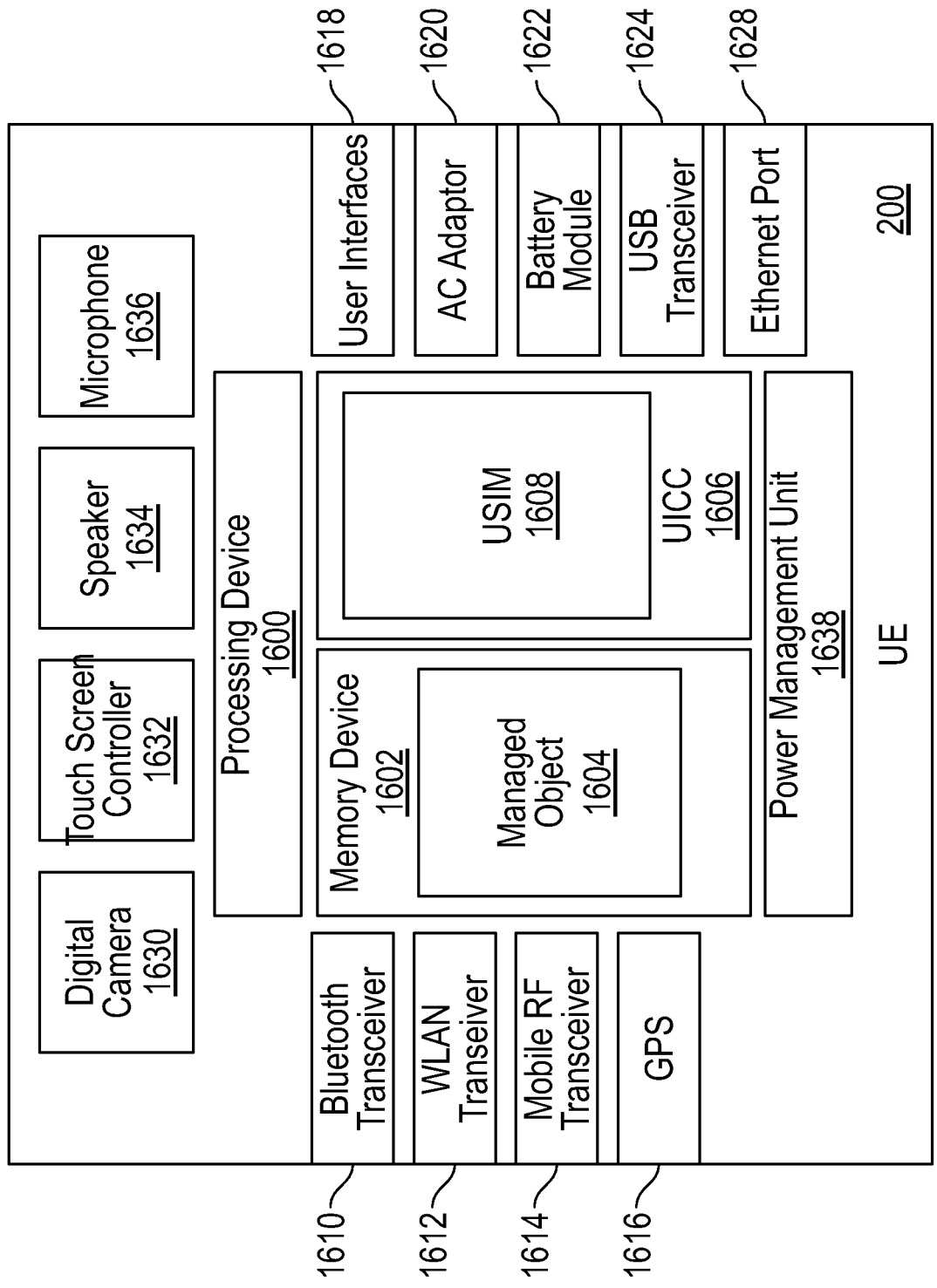
FIG. 16 illustrates a schematic block diagram of an embodiment of example user equipment.

FIG. 16 illustrates a schematic block diagram of an embodiment of example user equipment 200. The user equipment (UE) 200 may include a smart phone, smart tablet, laptop, smart watch, PC, TV or other device operable to communicate over a non-3GPP access network 110. Additional or alternative components and functions may be included within the UE 200. In addition, one or more of the functions and components shown herein may not be present or combined with other components or functions.

The UE 200 includes a processing device 1600 and memory device 1602 that are configured to perform one or more of the functions described herein with respect to the UE 200. The memory device 1602 may include a managed object 1604 that stores applications and operational instructions that controls the processing device 1600 to perform various functions described herein. The UE 200 may also include a UICC 1606 that includes a USIM 1608 for storage of the IMSI. In other embodiments, the UE 200 does not have UICC capabilities, e.g. the UE 200 does not have a UICC 1606, has an inoperable UICC 1606, etc.

The UE 200 may further include a Bluetooth transceiver 1610, a WLAN (IEEE 802.11x compliant) transceiver 1612, mobile RF (3G/4G) transceiver 1614 and GPS 1616. The WLAN transceiver 1612 may operate as a non-3GPP access interface to a WLAN network. The UE 200 may further include user interfaces 1618, AC adapter 1620, battery module 1622, USB transceiver 1624 and Ethernet Port 1628.

The UE 200 may further include a digital camera 1630, touch screen controller 1632, speaker 1634 and microphone 1636. The UE 200 may also include a power management unit 1638. One or more internal communication buses (not shown) may communicatively couple one or more of the components of the UE 200.

Figure 17:
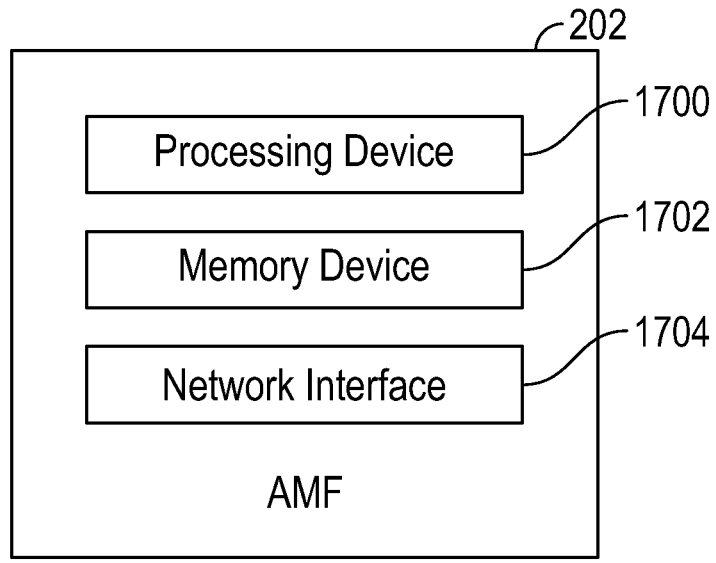
FIG. 17 illustrates a schematic block diagram of an embodiment of an AMF Node.

FIG. 17 illustrates a schematic block diagram of an embodiment of an example AMF 202. The AMF 202 includes any node or nodes with the functionality of the AMF 202. The AMF 202 may be integrated with other nodes in the 5GCN 100. Additional or alternative components and functions may be included within the AMF 202. In addition, one or more of the functions and components shown herein may not be present or combined with other components or functions or nodes. The AMF 202 includes a processing device 1700 and memory device 1702 that are configured to perform one or more of the functions described herein with respect to the AMF 202. The AMF 202 may include a network interface 1704 that includes ports for interfacing to other network nodes in the 5GCN 100.

Figure 18:
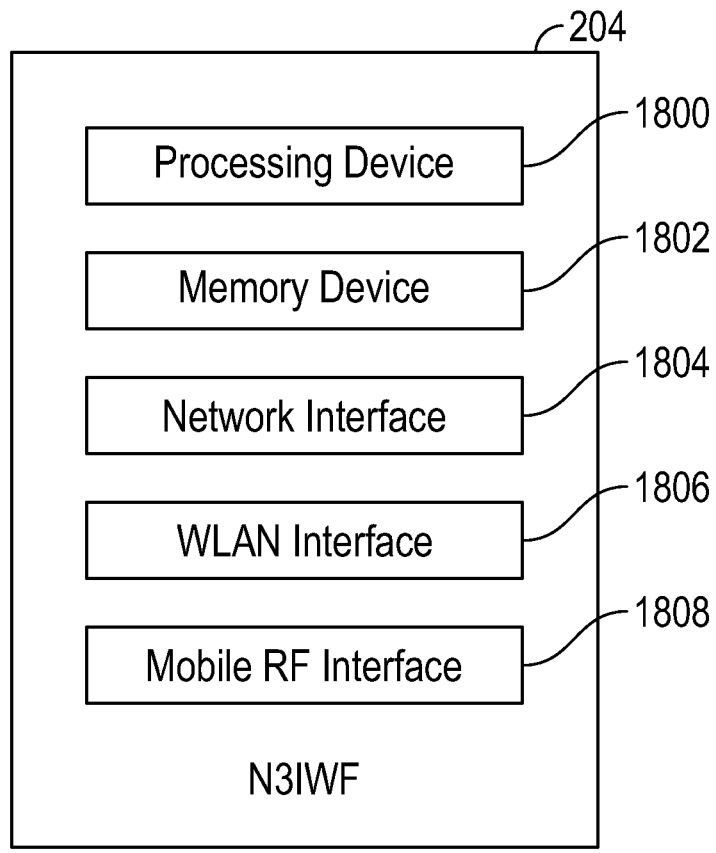
FIG. 18 illustrates a schematic block diagram of an embodiment of an N3IWF.

FIG. 18 illustrates a schematic block diagram of an embodiment of an example N3IWF 204. The N3IWF 204 may be an access point in a wireless local area network, a gateway in a local area network, or other type of node including the interworking functions described herein. The N3IWF 204 may be integrated with other nodes in an access network or 5GCN 100. Additional or alternative components and functions may be included within the N3IWF 204. In addition, one or more of the functions and components shown herein may not be present or combined with other components or functions.

The N3IWF 204 includes a processing device 1800 and memory device 1802 that are configured to perform one or more of the functions described herein. The N3IWF 204 may include a first network interface 1804 (e.g. Ethernet ports, IP ports) for interfacing to other network nodes in the 5GCN 100. The N3IWF 204 may also include one or more other types of interfaces to communicate with the UE, such as a WLAN transceiver 1806 (e.g., compliant with IEEE 802.1x WLAN type networks). The N3IWF 204 may also include a mobile RF transceiver 1808 compliant with a cellular air interface. The UE 200 may communicate with the N3IWF 204 using one or more of the WLAN transceiver 1806 or Mobile RF transceiver 1808.

In an embodiment, the processing device is configured to receive the IPsec Security Association (SA) request from the UE 200 over the untrusted non-3GPP access network and perform an authentication protocol of the UE 200 in the untrusted non-3GPP access network, such as IKE protocol. The N3IWF 204 may then obtain an authentication response indicating that the IPsec SA request is not accepted by the core network. The N3IWF 204 may then generate an authentication response to the UE 200, wherein the authentication response indicates that access to the core network by the UE 200 over the untrusted access network is rejected.

A processing device as described herein includes at least one processing device, such as a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory device is a non-transitory memory device and may be an internal memory or an external memory, and the memory may be a single memory device or a plurality of memory devices. The memory device may be a read-only memory, random access memory, volatile memory, non-volatile memory, static memory, dynamic memory, flash memory, cache memory, and/or any non-transitory memory device that stores digital information. The term "module" is used in the description of one or more of the embodiments of elements herein. A module includes one or more processing devices and/or one or more non-transitory memory devices operable to perform one or more functions as may be described herein. A module may operate independently and/or in conjunction with other modules and may utilize the processing device and/or memory of other modules and/or operational instructions of other modules. As also used herein, a module may contain one or more sub-modules, each of which may be one or more modules.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. A non-third generation partnership project (non-3GPP) interworking function node (N3IWF) for managing network connections to a fifth-generation core network (5GCN), the N3IWF comprising:
   at least one processor; and
   at least one memory storing instructions thereon that, when executed by the at least one processor, cause the N3IWF to perform at least:
      processing a request for establishment of a secure connection to the 5GCN, the request being received from a user equipment (UE) over an untrusted non-3GPP access network;
      providing, to an access and mobility management function (AMF) in the 5GCN, an authentication and secure connection establishment request comprising a first indication that the request was received from the UE over an untrusted non-3GPP access network;
      receiving, from the AMF in the 5GCN, in response to the authentication and secure connection establishment request, a second indication that establishment of secure connections to the 5GCN over any untrusted non-3GPP access networks is not allowed by the 5GCN;
      providing, to the UE, a third indication that the request to establish the secure connection to the 5GCN is not approved because secure connection establishment to the 5GCN over any untrusted non-3GPP access networks is not allowed by the 5GCN; and
      receiving, from the UE, after providing the third indication to the UE, a stop message comprising a message identifier field set to 5G-Stop, the stop message terminating the request to establish the secure connection to the 5GCN previously received via the untrusted non-3GPP access network, wherein the message identifier field being set to 5G-Stop indicates to the N3IWF that the UE will not re-attempt establishment of a secure connection with the 5GCN over an untrusted non-3GPP access network.

2. The N3IWF of claim 1, wherein the instructions stored on the at least one memory, when executed by the at least one processor, further cause the N3IWF to perform:
   receiving, from the UE, via the untrusted non-3GPP access network, the request for establishment of the secure connection with the 5GCN;
   generating the request for authentication and subscription check;
   transmitting the request for authentication and subscription check towards the AMF in the 5GCN;
   receiving, from the AMF, an authentication response comprising the second indication that establishment of secure connections to the 5GCN over untrusted non-3GPP access networks is not allowed by the 5GCN;
   generating an Internet Key Exchange (IKE) response message, the IKE response message comprising a non-access stratum (NAS) payload, the NAS payload in the IKE response message comprising therein the third indication that secure connection establishment with the 5GCN over untrusted non-3GPP access networks is not allowed by the 5GCN; and
   providing, to the UE, the IKE response message comprising the NAS payload, the NAS payload storing therein the third indication that secure connection establishment with the 5GCN over untrusted non-3GPP access networks is not allowed by the 5GCN.

3. The N3IWF of claim 2, wherein the instructions stored on the at least one memory, when executed by the at least one processor, further cause the interworking function node to perform:
   receiving a response from the AMF, the response encapsulating a Registration Reject message including a 5G mobility management (5GMM) cause value indicating that access to the 5GCN via any untrusted non-3GPP access network is not allowed by the 5GCN; and
   generating the IKE response message with a non-access stratum (NAS) payload, the NAS payload including a message type indicating that establishment of a secure connection with the 5GCN over any untrusted Non-3GPP access network is not allowed by the 5GCN.

4. The N3IWF of claim 2, wherein the instructions stored on the at least one memory, when executed by the at least one processor, further cause the N3IWF to generate the IKE response message by:
   adding, to the IKE response message, a notify payload, the notify payload including a private notify message type, the privacy notify message type indicating a failure reason.

5. The N3IWF of claim 2, wherein the instructions stored on the at least one memory, when executed by the at least one processor, further cause the N3IWF to generate the IKE response message by:
   adding, to the IKE response message, a notify payload, the notify payload including a private notify message type, the private notify message type indicating that establishment of secure connections with the 5GCN over any untrusted non-3GPP access network is not allowed by the 5GCN.

6. The N3IWF of claim 1, wherein the instructions stored on the at least one memory, when executed by the at least one processor, further cause the N3IWF to perform:
   in response to receiving the stop message from the UE, generating a failure message to the UE.

7. The N3IWF of claim 1, wherein the instructions stored on the at least one memory, when executed by the at least one processor, further cause the N3IWF to perform:
   processing the stop message received from the UE, wherein the stop message includes a 5G-Stop message format having the message identifier field, and wherein the message identifier field includes the 5G-Stop identifier.

8. The N3IWF of claim 1, wherein the request for the connection establishment from the UE in the untrusted access network includes an IKE request message to initiate an IPsec Security Association (SA) with the 5GCN.

9. An Access and Mobility Management function (AMF) device for handling network connection requests received in a fifth-generation core network (5GCN) from user equipment (UE) via a non-third generation partnership project (non-3GPP) interworking function node (N3IWF), the AMF device comprising:
at least one processor; and
at least one memory storing instructions thereon that, when executed by the at least one processor, cause the AMF device to perform at least:
receiving, from the N3IWF, an authentication and secure connection establishment request, the authentication and secure connection establishment request being associated with a message received at the N3IWF from a UE over an untrusted non-3GPP access network, the message comprising a request for establishment of a secure connection between the UE and the 5GCN;
in response to receiving the authentication and secure connection establishment request from the N3IWF, providing, to an Authentication Server Function (AUSF) of the 5GCN, an authentication and subscription check request;
receiving, from the AUSF of the 5GCN, an authentication and subscription check response indicating that the authentication and subscription check has failed, the authentication and subscription check response comprising a second indication that secure connection establishment with the 5GCN via any untrusted non-3GPP access network is not allowed by the 5GCN;
in response to determining that the authentication and subscription check by the AUSF has failed, generating an authentication and secure connection establishment response message comprising an Extensible Authentication Protocol (EAP) failure indication and a cause value indicating that secure connection establishment with the 5GCN over any untrusted non-3GPP access network is not allowed by the 5GCN; and
providing, to the N3IWF, the authentication and secure connection establishment response message comprising the EAP failure indication and the cause value indicating that secure connection establishment with the 5GCN over any untrusted non-3GPP access network is not allowed by the 5GCN, wherein the EAP failure indication and the cause value, when received by the UE, cause the UE to send a message including a message identifier field set to 5G-Stop to indicate that the UE will not re-attempt establishment of a secure connection with the 5GCN over an untrusted non-3GPP access network and further cause the UE to refrain from re-attempting to establish a secure connection with the 5GCN over an untrusted non-3GPP access network.

10. The AMF device of claim 9, wherein the instructions stored on the at least one memory, when executed by the at least one processor, further cause the AMF device to perform:
encapsulating, in the response message, a Registration Reject message that includes the cause value, wherein the cause value includes a 5G mobility management (5GMM) cause value indicating that secure connection establishment to the 5GCN over any untrusted Non-3GPP access network is not allowed by the 5GCN.

11. A user equipment (UE) comprising:
at least one processor; and
at least one memory storing instructions thereon that, when executed by the at least one processor, cause the UE to perform at least:
generating a request for establishment of a secure connection between the UE and a fifth-generation core network (5GCN);
sending, to a non-third generation partnership project (non-3GPP) interworking function node (N3IWF), over an untrusted non-3GPP access network, a secure connection establishment request message comprising the request for establishment of a secure connection between the UE and the 5GCN over the untrusted non-3GPP access network;
receiving, from the N3IWF, a secure connection establishment reject message, the secure connection establishment reject message comprising a 5G mobility management (5GMM) cause value indicating that the 5GCN does not allow secure connection establishment with the 5GCN over any untrusted non-3GPP access networks;
determining, based on the 5GMM cause value in the secure connection establishment reject message received from the N3IWF, that the 5GCN does not allow secure connection establishment with the 5GCN over any untrusted non-3GPP access networks;
in response to determining that the 5GCN does not allow secure connection establishment with the 5GCN over any untrusted non-3GPP access networks, generating a stop message comprising a message identifier field, the message identifier field including a 5G stop identifier, the stop message indicating an end to the request for establishment of a secure connection between the UE and the 5GCN over the untrusted non-3GPP access network;
setting the 5G stop identifier in the message identifier field of the stop message to 5G-Stop;
transmitting the stop message towards the N3IWF to terminate the request for establishment of a secure connection between the UE and the 5GCN over the untrusted non-3GPP access network; and
performing an IKE security association closure procedure without re-attempting establishment of a secure connection with the 5GCN over an untrusted non-3GPP access network.

12. The UE of claim 11, wherein the instructions stored on the at least one memory, when executed by the at least one processor, further cause the UE to perform:
generating the stop message as an Extensible Authentication Protocol (EAP)-Response formatted message.

* * * * *